United States Patent
Sasaki

(10) Patent No.: US 7,457,014 B2
(45) Date of Patent: Nov. 25, 2008

(54) IMAGE PROCESSING APPARATUS AND IMAGE PROCESSING SYSTEM

(75) Inventor: Gen Sasaki, Osaka (JP)

(73) Assignee: Mega Chips Corporation, Osaka-shi (JP)

( * ) Notice: Subject to any disclaimer, the term of this patent is extended or adjusted under 35 U.S.C. 154(b) by 1032 days.

(21) Appl. No.: 10/811,934

(22) Filed: Mar. 30, 2004

(65) Prior Publication Data
US 2004/0189838 A1 Sep. 30, 2004

(30) Foreign Application Priority Data
Mar. 31, 2003 (JP) ............... 2003-094115

(51) Int. Cl.
H04N 1/46 (2006.01)
(52) U.S. Cl. ...................... 358/515; 358/518
(58) Field of Classification Search .............. 348/242, 348/246, 247; 358/474, 3.03, 2.1, 3.26, 447, 358/463, 515, 516, 517, 518, 530
See application file for complete search history.

(56) References Cited

U.S. PATENT DOCUMENTS

| | | | | |
|---|---|---|---|---|
| 5,077,602 A | * | 12/1991 | Moberg | 348/256 |
| 6,507,011 B2 | * | 1/2003 | Ang | 250/208.1 |
| 6,806,902 B1 | * | 10/2004 | Donovan | 348/246 |
| 2003/0193579 A1 | * | 10/2003 | Mori et al. | 348/222.1 |
| 2004/0189838 A1 | * | 9/2004 | Sasaki | 348/242 |
| 2004/0223196 A1 | * | 11/2004 | Tanimoto et al. | 358/514 |

FOREIGN PATENT DOCUMENTS

| | | | |
|---|---|---|---|
| JP | 07236148 | * | 9/1995 |
| JP | 10-308901 | | 11/1998 |

OTHER PUBLICATIONS http://www.foveon.com/X3_better.html, pp 1/2-2/2, "Why X3 is Better", Mar. 8, 2004.

* cited by examiner

Primary Examiner—Jerome Grant, II
(74) Attorney, Agent, or Firm—Oblon, Spivak, McClelland, Maier & Neustadt, P.C.

(57) ABSTRACT

An SPU (image processor) includes: a plurality of defective pixel correction circuits each for correcting a color component signal associated with a defective pixel of an image sensor in accordance with a control signal; an input control circuit for receiving defect correction data transferred from a memory at a time of input of a plurality of color component signals; and a timing generator for generating the control signal based on the defect correction data. The defective pixel correction circuits correct color component signals associated with one and the same defective pixel in parallel, at the same time in accordance with the control signal.

19 Claims, 14 Drawing Sheets

F I G . 8
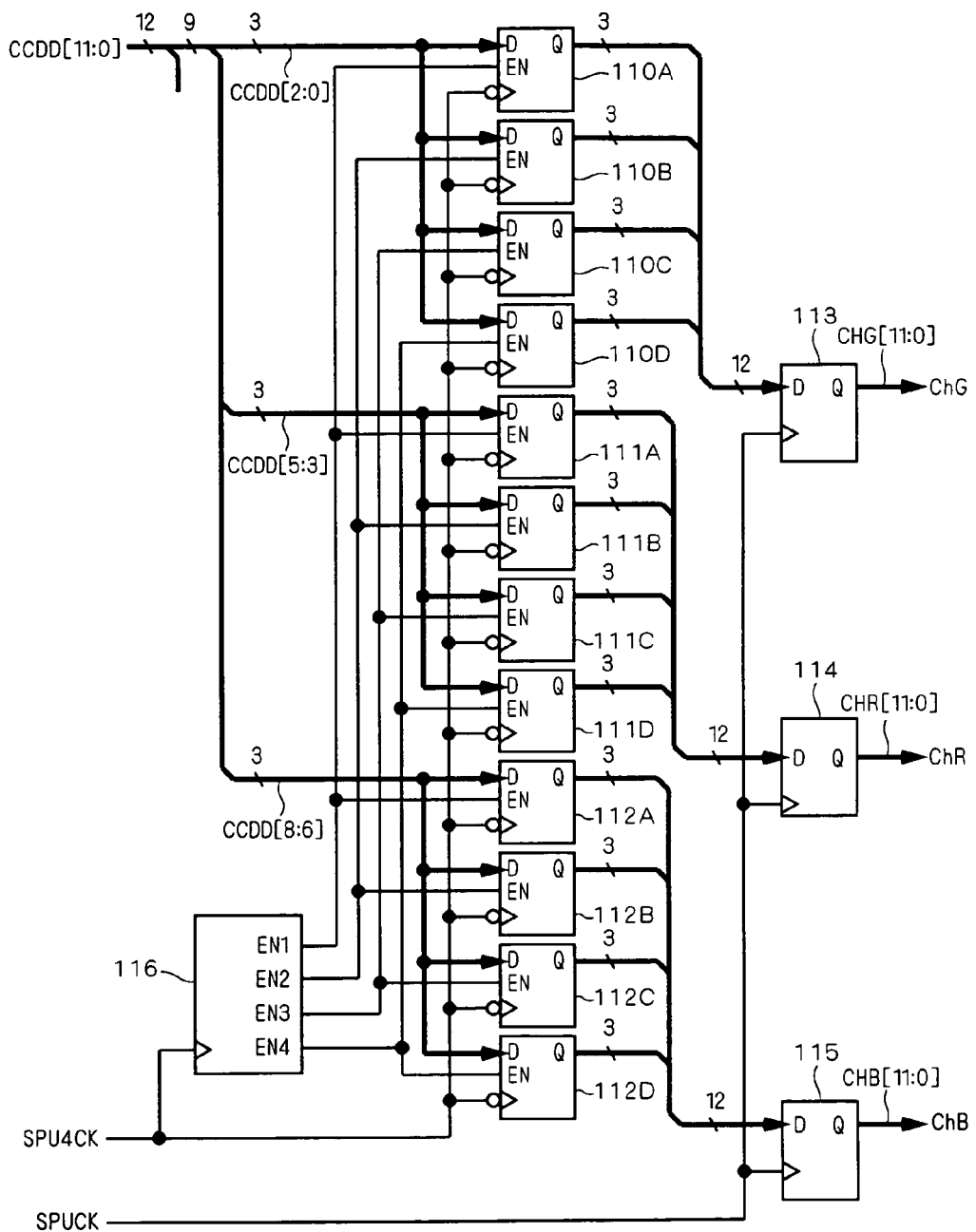

F I G . 1 4
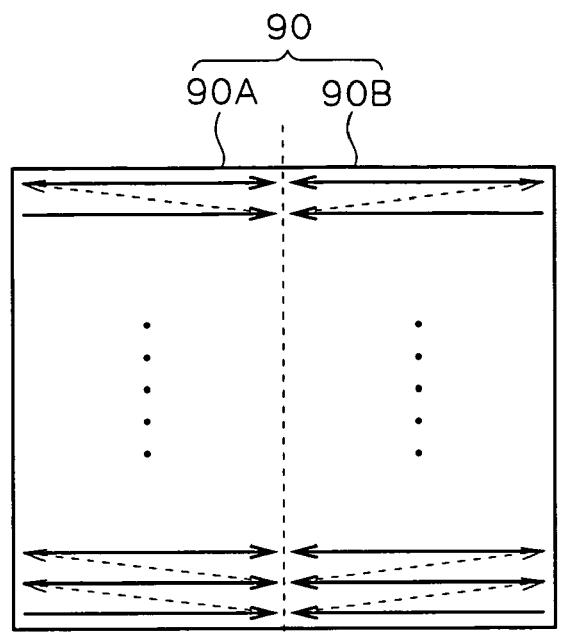
F I G . 1 5
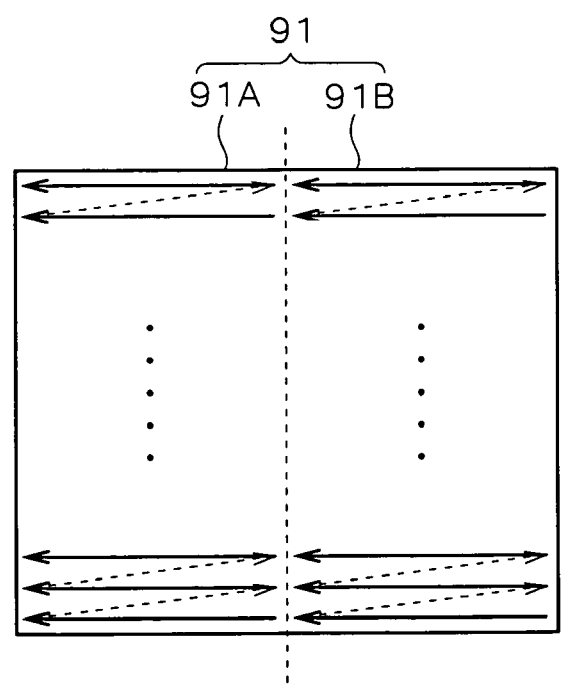

IMAGE PROCESSING APPARATUS AND IMAGE PROCESSING SYSTEM

BACKGROUND OF THE INVENTION

1. Field of the Invention

The present invention relates to an apparatus and a system for processing an image signal output from a solid state imaging device such as a CCD or a CMOS.

2. Description of the Background Art

A typical digital camera is equipped with a solid state imaging device (which will hereinafter be abbreviated to an "imaging device") such as a CCD or a CMOS. Conventionally, digital cameras of a type which is equipped with a single imaging device (which will hereinafter be referred to as a "single chip digital camera"), as well as digital cameras of a type which is equipped with three imaging devices designed to provide R (red), G (green) and B (blue), respectively, (which will hereinafter be referred to as a "3-chip digital camera"), have been widely used. In a single chip digital camera, a R, G or B color filter is provided on each pixel of a light receiving part of an imaging device. The color filters are arranged in a well-known Bayer pattern or the like. In the single chip digital camera, the imaging device captures an image to produce an image signal, and pixel interpolation is performed on the produced image signal so that each pixel has plural color components for R, G and B. However, the pixel interpolation causes problems of reduction in resolution, generation of false color and the like, as is known.

As for a 3-chip digital camera, there is a need of processing image signals output in parallel from three imaging devices. This complicates circuit arrangement for image processing, to easily invite increase of manufacturing cost. Additionally, details of image processing performed by a 3-chip digital camera can be found in Japanese Patent Application Laid-Open No. 10-308901, for example.

In the meantime, in recent years, a single full-color imaging device such as "Foveon X3 direct image sensor" in which each pixel is provided with three layers of light receiving parts for R, G and B, respectively, has been developed. In this type of imaging device, an incident light is detected by each of the three layers of light receiving parts for R, G and B. As a result, component signals for three colors of R, G and B are output in parallel from a single chip, and pixel interpolation is unnecessary. As such, the single full-color imaging device is advantageous in that the above-noted problems of reduction in resolution, generation of false color and the like are not likely to occur. Additionally, details of the single full-color imaging device can be retrieved from internet http://www.foveon.com/X3_better.html, for example.

As the foregoing type of imaging device, i.e., a single full-color imaging device, becomes more widely available, a demand for a low-cost and small-scale image processing chip which has low power consumption and can be adapted to a digital camera equipped with a single full-color imaging device, as well as to the conventional single digital camera, increases.

SUMMARY OF THE INVENTION

The present invention is intended for an image processing apparatus.

According to one aspect of the present invention, an image processing apparatus includes: an input terminal for receiving a plurality of color component signals output in parallel from an image sensor; a plurality of defective pixel correction circuits for correcting the plurality of color component signals associated with a defective pixel of the image sensor with a predetermined timing; and a defective pixel correction timing generator for generating the predetermined timing used in performing defective pixel correction at a time of input of the plurality of color component signals. In the image processing apparatus, the plurality of defective pixel correction circuits correct the plurality of color component signals, all of which are associated with the defective pixel, in parallel at the same time with the predetermined timing.

Since a plurality of color component signals associated with one and the same defective pixel are corrected in parallel at the same time, there is no need of generating a timing for each of the plurality of defective pixel correction circuits. Accordingly, an amount of transferred defect correction data is reduced, to provide for improved efficiency in use of a bus.

According to another aspect of the present invention, an image processing apparatus includes: an input terminal for receiving a YUV signal including a luminance signal and a color difference signal, and a plurality of color component signals; a selector for selecting one of the YUV signal and the plurality of color component signals which are input to the selector, to provide a plurality of selected signals, and outputting the plurality of selected signals; and a signal processor for processing the plurality of selected signals. In the image processing apparatus, the input terminal is shared by the YUV signal and the plurality of color component signals.

Because of the foregoing structure, the number of input pins provided in input terminals is reduced, to provide for reduction of a circuit scale.

It is therefore an object of the present invention to provide a low-cost and small-scale image processing apparatus which has low power consumption and is capable of performing parallel processing on a plurality of color component signals output in parallel from an image sensor.

These and other objects, features, aspects and advantages of the present invention will become more apparent from the following detailed description of the present invention when taken in conjunction with the accompanying drawings.

BRIEF DESCRIPTION OF THE DRAWINGS

FIG. 8 schematically illustrates a structure of a sampling circuit of an SPU according to a fourth preferred embodiment of the present invention.

FIG. 14 diagrammatically shows scanning directions in which signals are read out from a light receiving part of an image sensor.

FIG. 15 diagrammatically shows arrangement of image signals according to the seventh preferred embodiment.

DESCRIPTION OF THE PREFERRED EMBODIMENTS

Below, various preferred embodiments of the present invention will be described in detail.

Structure of Image Capture Apparatus 1

Figure 1:
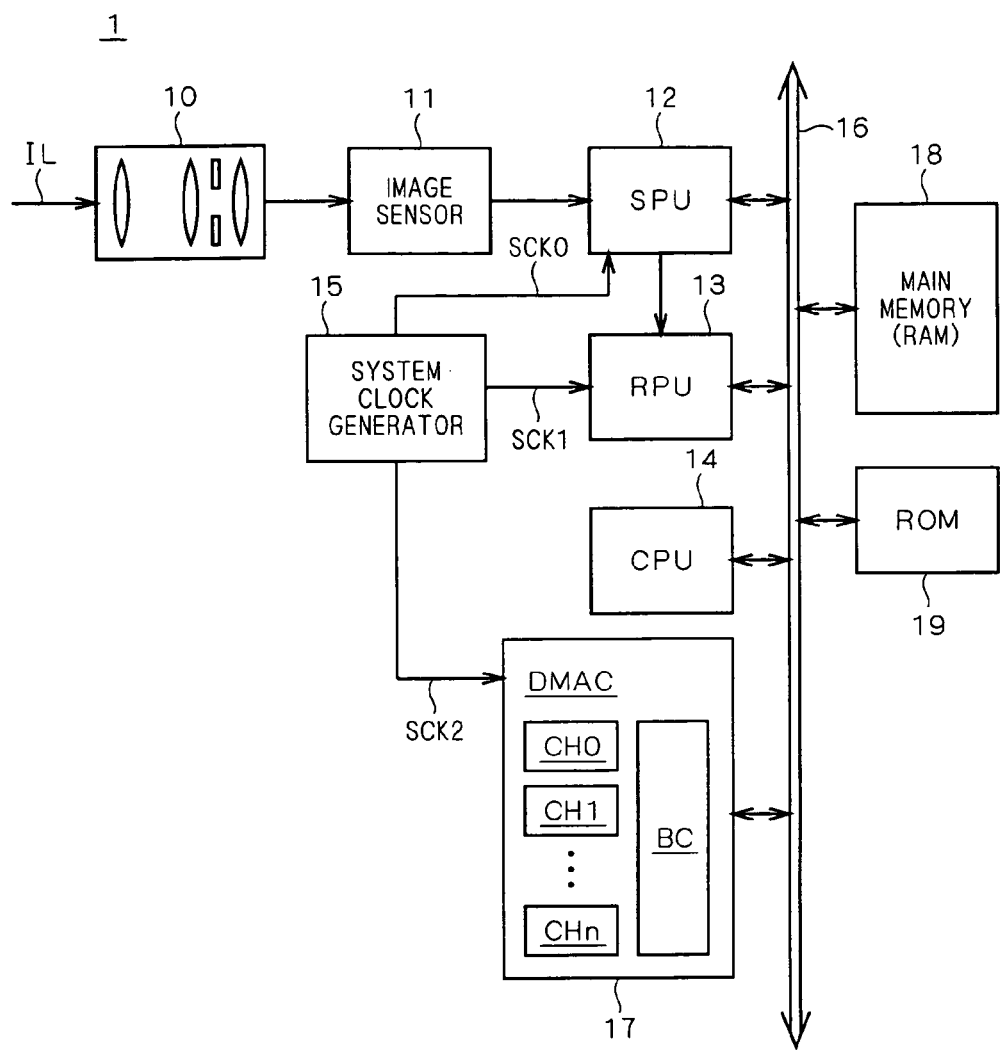
FIG. 1 is a block diagram schematically illustrating a structure of an image capture apparatus (digital camera) according to preferred embodiments of the present invention.

FIG. 1 is a block diagram schematically illustrating a structure of an image capture apparatus (digital camera) 1 according to the preferred embodiments of the present invention. The image capture apparatus 1 includes an optical system 10, an image sensor 11, an SPU (signal processing unit) 12, an RPU (real-time processing unit) 13, a CPU (central processing unit) 14, a main memory 18, a ROM 19, a DMA controller (DMAC) 17, a bus 16 and a system clock generator 15. The bus 16 includes an address bus, a data bus, a bus used for DMA transfer and the like. Transfer of signals among modules 12, 13, 14, 17, 18 and 19 via the bus 16 are performed under control of the CPU 14 or the DMAC 17. It is noted that the terms "data transfer controller" will be used to mean one of the CPU 14 and the DMAC 17, and also mean both the CPU 14 and the DMAC 17, in the present specification. Further, the system clock generator 15 generates clock signals SCK0, SCK1 and SCK2, to supply the generated clock signals SCK0, SCK1 and SCK2 to the SPU 12, the RPU 13 and the DMAC 17.

The image capture apparatus 1 further includes a display device for displaying a captured image, various interface circuits for making the image capture apparatus 1 compatible with peripheral devices such as a memory card, a compression/coding circuit, an entry device such as an entry button or a dial, a flash unit for emitting a flash light, though those elements are not illustrated in FIG. 1.

The optical system 10 includes a group of lenses and a prism. The optical system 10 has an AF (autofocus) function and is capable of adjusting an aperture. Thus, an incident light IL emitted from a subject is transmitted through the optical system 10, to form an image in the image sensor 11. The incident light IL, having arrived at the image sensor 11, passes through an optical LPF (low pass filter) not illustrated, and then is received by an imaging device such as a CCD or a CMOS. After the light IL is transmitted through the optical LPF, the light IL is photoelectrically converted into an analog image signal in the image sensor 11. Subsequently, CDS (Correlated Double Sampling) processing, AGC (Automatic Gain Control) processing and A/D conversion are sequentially performed on the analog image signal, which is then output, as a digital image signal, to the SPU 12.

The SPU 12 performs defective pixel correction or the like for the digital image signal input from the image sensor 11, and thereafter outputs the digital image signal to the bus 16 or the RPU 13. The RPU 13 can function to perform various digital image processing such as shading correction, pixel interpolation, gamma correction, color space conversion, contour enhancement and conversion of resolution, on the image signal input from the SPU 12, in real time. The image signal (or image data) output from the SPU 12 or the RPU 16 to the bus 16 can be transferred to and stored in the main memory 18 under control of the CPU 14 or the DMAC 17. Further, the CPU 14 loads a program from the ROM 19 and executes the program, to perform various software-driven processing on the image data read out from the main memory 18.

The DMAC 17 includes a plurality of DMA channels CH0 to CHn (n is an integer equal to or larger than 1) and a bus controller BC. Upon receipt of a request for DMA transfer from another module, a control part (not illustrated) of the DMAC 17 selects one DMA channel CHk (k is any value in the range from 0 to n) from the plurality of DMA channels CH0 to CHn, to assign the selected DMA channel CHk to the DMA transfer. Also, the control part of the DMAC 17 makes a request to the bus controller BC for acquisition of a bus. When the bus controller BC successfully complies with the request for acquisition of a bus, the bus controller BC performs data transfer between modules using the selected DMA channel CHk. After the DMA transfer is completed, the bus controller BC releases the bus which has been used for the data transfer. Also, in performing DMA transfer of plural items of data, plural DMA channels are assigned to the DMA transfer, and the DMA transfer of the plural items of data is performed in a time-shared manner.

Next, respective structures of elements forming the image capture apparatus 1 having the foregoing structure will be described in detail.

1. First Preferred Embodiment

Figure 2:
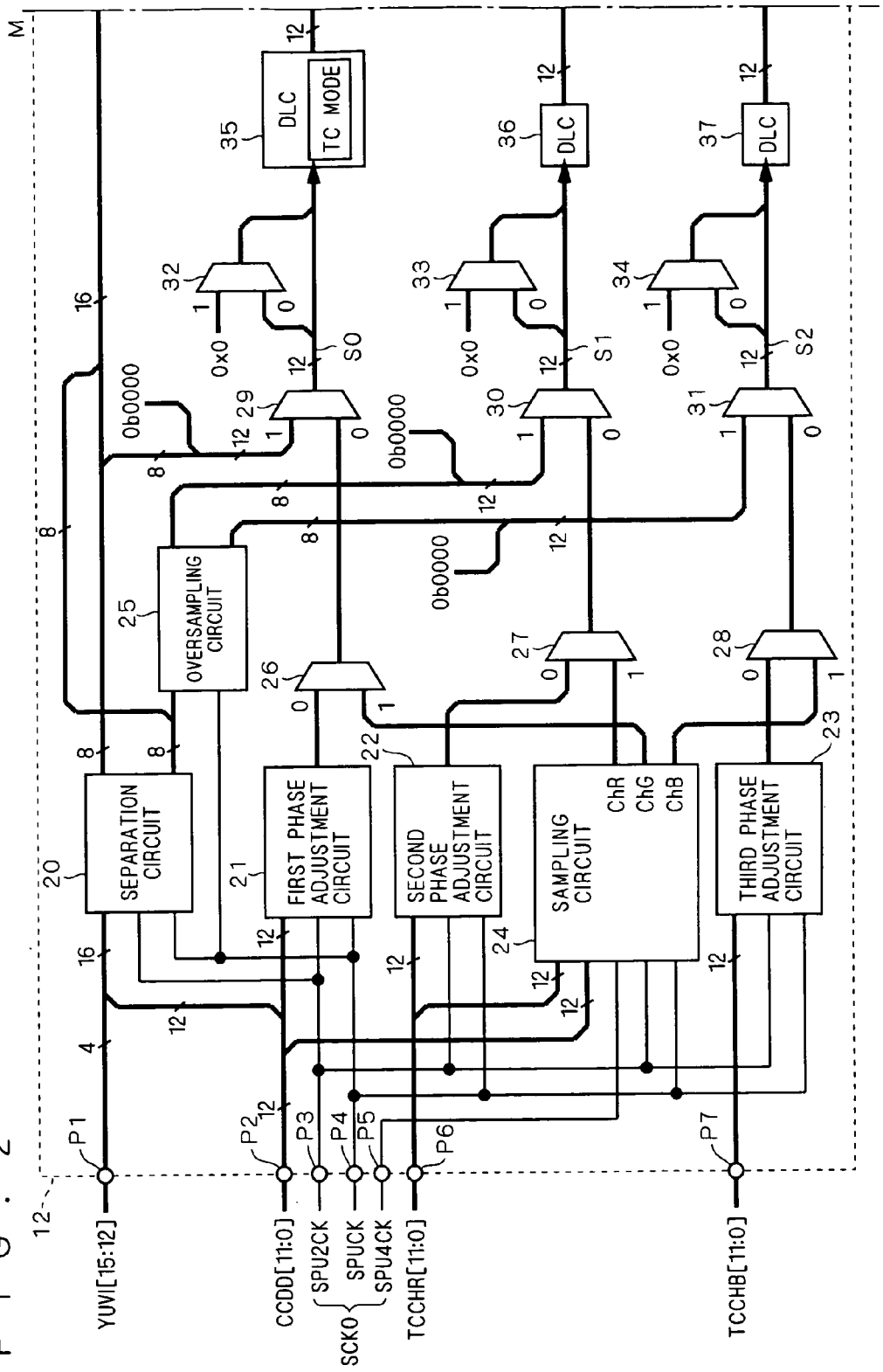
FIGS. 2 and 3 schematically illustrate circuit arrangement of an SPU (image processor) according to a first preferred embodiment of the present invention.
Figure 3:
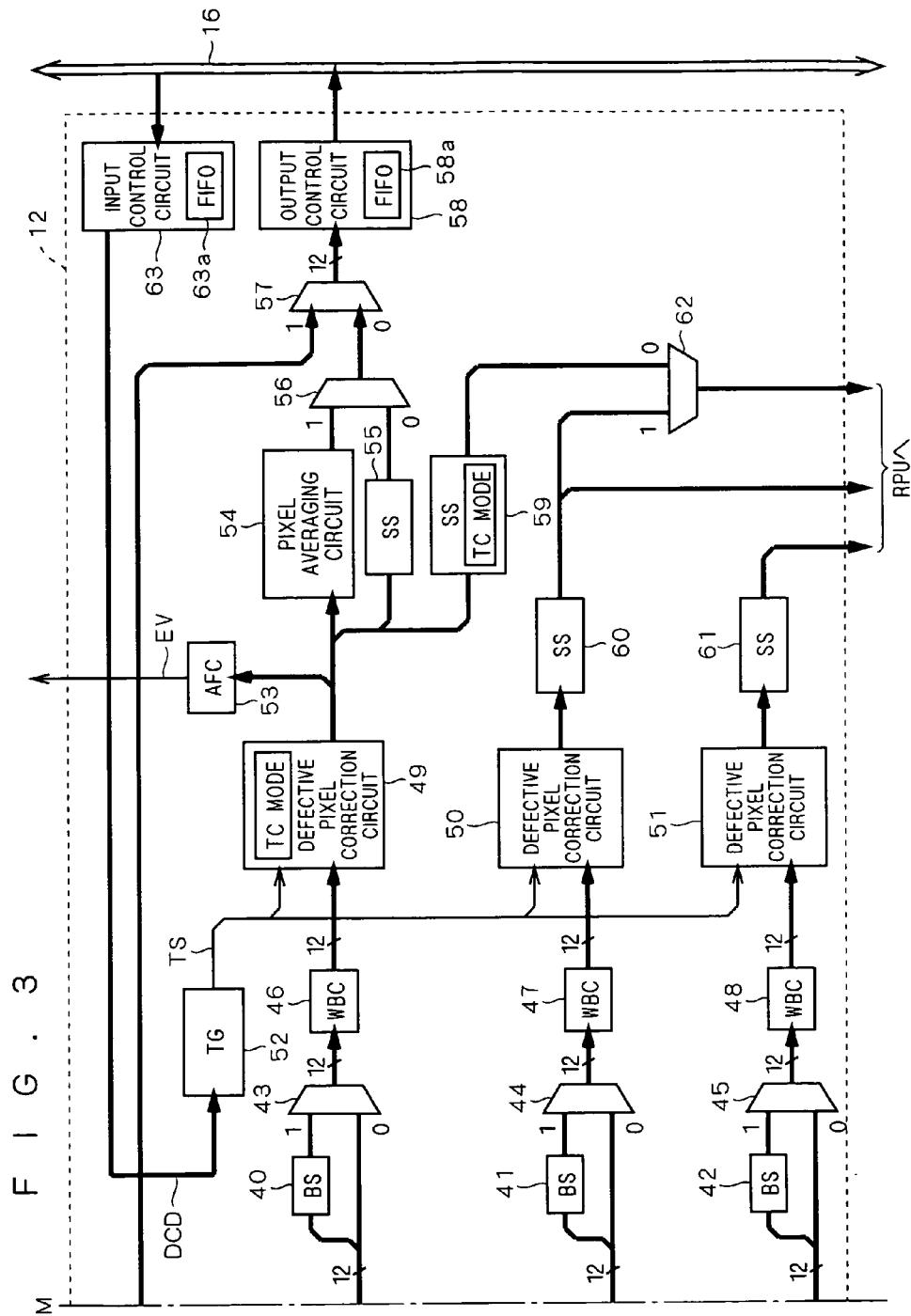

FIGS. 2 and 3 schematically illustrate circuit arrangement of the SPU (image processor) 12 according to a first preferred embodiment of the present invention. It is noted that circuits illustrated in FIGS. 2 and 3 are continuously connected with one another via a dashed line M. The SPU 12 illustrated in FIGS. 2 and 3 functions to handle color component signals for primary colors, R, G, B, a 16-bit YUV signal and a RAW data signal which are input to the SPU 12, having been first received by input terminals P1 to P7 of the SPU 12.

Processing on Color Component Signals for Primary Colors R, G and B

For processing on color component signals for primary colors R, G and B, a G signal, an R signal and a B signal are input in parallel with one another to the input terminals P2, P6 and P7, respectively, from the image sensor 11. The 12-bit wide G signal CCDD [11:0] input to the input terminal P2 is transmitted to a first phase adjustment circuit 21, first, and then is sequentially transmitted from the first phase adjustment circuit 21 to selectors 26 and 29 and a dark level correction circuit (DLC) 35, as illustrated in FIG. 2. The G signal CCDD [11:0] is further transmitted to a selector 43, a white balance correction circuit (WBC) 46 and a defective pixel correction circuit 49 illustrated in FIG. 3. Thereafter, the G signal is output from the defective pixel correction circuit 49, and is sent to an AF evaluation value calculation circuit (AFC) 53, a pixel averaging circuit 54, a subsampling circuit 55 and a subsampling circuit 59. The G signal transmitted to the pixel averaging circuit 54 or the subsampling circuit 55 is output to an output control circuit 58 via selectors 56 and 57, and is further output to the bus 16 from the output control circuit 58. On the other hand, the G signal transmitted to the subsampling circuit 59 can be output to the RPU 13 via a selector 62.

More specifically, the first phase adjustment circuit 21 samples the G signal CCDD [11:0] transmitted from the input terminal P2 using clock signals SPU2CK and SPUCK to adjust the phase of the G signal, and thereafter outputs the G signal to a "0"-th terminal of the selector 26. The selector 26 selects either the "0"-th terminal or a "1"-st terminal depending on a value of a selection control signal (not illustrated) supplied from the CPU 14, and outputs a signal received by the selected terminal to a "0"-th terminal of the selector 29 in the next stage. In an example given herein (present example), the selector 26 selects the "0"-th terminal and outputs the G signal input from the first phase adjustment circuit 21, to the selector 29.

The selector 29 selects either the "0"-th terminal or a "1"-st terminal depending on a value of a selection control signal (not illustrated) supplied from the CPU 14, and outputs a signal (selected signal) S0 received by the selected terminal. In the present example, the selector 29 selects the "0"-th terminal and outputs the signal transmitted from the selector 26 in the preceding stage, as the selected signal S0.

Then, upper two bits of the selected signal S0 are input to a "0"-th terminal of a selector 32, and lower ten bits of the selected signal S0 are input to the dark level correction circuit (DLC) 35. The selector 32 selects either the "0"-th terminal or a "1"-st terminal depending on a value of a selection control signal (not illustrated) supplied from the CPU 14, and outputs a 2-bit signal received by the selected terminal. When the selector 32 selects the "1"-st terminal, a 2-bit signal representing "zero" (=0×0) is output. The 2-bit signal output from the selector 32 and the lower ten bits of the selected signal S0 are joined and sent to the dark level correction circuit 35. As is made clear from this, the selector 32 is included in order to make the SPU 12 compatible with the image sensor 11 which provides a 10-bit output. When the SPU 12 is connected to the image sensor 11 which outputs a 10-bit signal, the selector 32 is caused to select the "1"-st terminal and the upper two bits of the selected signal S0 are masked. As a result, a terminal to which the masked upper two bits of the selected signal S0 are input can be utilized for different purposes.

The dark level correction circuit 35 functions to correct a gradation of a signal input to the dark level correction circuit 35 so that a dark level of the input signal is equal to a reference level. The dark level correction circuit 35 includes a register (not illustrated) storing a value of the reference level. The dark level correction circuit 35 outputs a 12-bit signal, which is then input to a 2-bit shift calculator (BS) 40 and a "0"-th terminal of the selector 43 illustrated in FIG. 3.

The 2-bit shift calculator 40 functions to shift the 12-bit signal transmitted from the dark level correction circuit 35 to the left by two bits, and output it to a "1"-st terminal of the selector 43. When the SPU 12 is connected to the image sensor 11 which provides a 10-bit output, components of an image are included in lower ten bits of the 12-bit signal output from the dark level correction circuit 35. Accordingly, shift of the 12-bit signal output from the dark level correction circuit 35 to the left by two bits results in movement of the components of the image from the lower ten bits of the 12-bit signal to upper ten bits of the 12-bit signal. Those processes of shifting the 12-bit signal are needed to allow for white balance correction performed in the later stage. The selector 43 selects either the "0"-th terminal or the "1"-st terminal depending on a value of a selection control signal (not illustrated) supplied from the CPU 14, and outputs a signal received by the selected terminal, to the white balance correction circuit (WBC) 46.

The white balance correction circuit (WBC) 46 corrects a tone of a signal which has been transmitted from the selector 43 in the preceding stage and input to the white balance correction circuit 46, to make the tone of the signal equal to a reference value. Then, the white balance correction circuit 46 outputs the signal to the defective pixel correction circuit 49. The white balance correction circuit 46 includes a register (not illustrated) storing the reference value for a tone.

The defective pixel correction circuit 49 corrects an input signal associated with a defective pixel of the image sensor 11 and outputs the corrected input signal at a time when a control signal TS is supplied from a timing generator TG 52. If one input signal is associated with a defective pixel, the defective pixel correction circuit 49 averages signals associated with normal pixels located close to the defective pixel to generate a new signal and replaces the new signal for the input signal associated with the defective pixel, for example.

A location of a defective pixel is previously detected during inspection of the image sensor 11, and defect correction data DCD containing information about the location of the defective pixel is recorded on the ROM 19 (FIG. 1). The defect correction data DCD is transferred by the DMAC 17 from the ROM 19 to the SPU 12 for each pixel at a time of input of a G signal to the defective pixel correction circuit 49, and is received by an input control circuit 63. It is additionally noted that the defect correction data DCD is not always transferred directly from the ROM 19 by a DMA method. Alternatively, the defect correction data DCD may be once copied into the RAM 18, and then subjected to DMA transfer. The input control circuit 63 drives a FIFO circuit 63a to perform buffering on the received defect correction data DCD, and thereafter sends the defect correction data DCD to the timing generator 52. The timing generator 52 generates the control signal TS based on the defect correction data DCD, and sends the control signal TS to the defective pixel correction circuit 49 and other defective pixel correction circuits 50 and 51 which will be described later. Thus, the three defective pixel correction circuits 49, 50 and 51 correct signals associated with one and the same pixel at the same time. It is noted that the defect correction data DCD need not necessarily be previously stored in a memory such as the ROM 19 or the RAM 18, to be transferred from the memory by a DMA method. Alternatively, the defect correction data DCD may be stored in a register included in the timing generator 52, for example. Further alternatively, the defect correction data DCD stored in a memory such as the ROM 19 may be transferred by the CPU without use of DMA method, if the CPU 14 has a handling capability enough to do so. In short, storage location of the defect correction data DCD and a method for transferring the defect correction data DCD are not limited to any specific location and method in the present invention.

The G signal output from the defective pixel correction circuit 49 is sent to the AF evaluation value calculation circuit (AFC) 53, the pixel averaging circuit 54 and the subsampling circuits 55 and 59. The AF evaluation value calculation circuit 53 calculates an evaluation data signal EV for autofocus control using the G signal output from the defective pixel correction circuit 49. The pixel averaging circuit 54 averages input signals respectively associated with dozens of pixels, to generate an evaluation data signal for white balance correction or automatic exposure, and outputs the generated evaluation data signal to a "1"-st terminal of the selector 56. The subsampling circuit 55 subsamples an input signal to reduce a resolution of the input signal, and outputs a resultant signal to a "0"-th terminal of the selector 56. Also the subsampling circuit 59 performs the same process as performed by the subsampling circuit 55, to output a resultant signal to a "0"-th terminal of the selector 62. It is noted that each of the subsampling circuits 55 and 59 can output an input signal without subsampling the input signal, also.

The selector 56 selects either the "0"-th terminal or the "1"-st terminal depending on a value of a selection control signal (not illustrated) supplied from the CPU 14, and outputs a signal received by the selected terminal, to a "0"-th terminal of the selector 57 in the next stage. In addition to the signal received by the "0"-th terminal, the selector 57 receives a signal transmitted from a separation circuit 20 described later at a "1"-st terminal thereof. The selector 57 then selects either "0"-th terminal or the "1"-st terminal depending on a value of a selection control signal (not illustrated) supplied from the CPU 14, and outputs a signal received by the selected terminal, to the output control circuit 58. The output control circuit 58 drives a FIFO circuit 58*a* to perform buffering on the signal input to the output control circuit 58, and outputs the corresponding signal to the bus 16, where the signal is subjected to DMA transfer.

As for the 12-bit wide R signal TCCHR [11:0] input to the input terminal P6 of the SPU 12, the R signal is transmitted to a second phase adjustment circuit 22 illustrated in FIG. 2, first, and further transmitted to selectors 27 and 30 and a dark level correction circuit 36 illustrated in FIG. 2. Thereafter, the R signal is transmitted to a selector 44, a white balance correction circuit 47, a defective pixel correction circuit 50 and a subsampling circuit 60 illustrated in FIG. 3, and then is output to the RPU 13.

More specifically, the second phase adjustment circuit 22 samples the R signal TCCHR [11:0] transmitted from the input terminal P6 using the clock signals SPU2CK and SPUCK to adjust the phase of the R signal, and thereafter outputs the R signal to a "0"-th terminal of the selector 27. The selector 27 selects either the "0"-th terminal or a "1"-st terminal depending on a value of a selection control signal (not illustrated) supplied from the CPU 14, and outputs a signal received by the selected terminal, to a "0"-th terminal of the selector 30 in the next stage. In the present example, the selector 27 selects the "0"-th terminal and outputs the R signal input from the second phase adjustment circuit 22, to the selector 30.

The selector 30 selects either the "0"-th terminal or a "1"-st terminal depending on a value of a selection control signal (not illustrated) supplied from the CPU 14, and outputs a signal (selected signal) S1 received by the selected terminal. In the present example, the selector 30 selects the "0"-th terminal and outputs the signal transmitted from the selector 27 in the preceding stage, as the selected signal S1.

Then, upper two bits of the selected signal S1 are input to a "0"-th terminal of a selector 33, and lower ten bits of the selected signal S1 are input to the dark level correction circuit (DLC) 36. The selector 33 selects either the "0"-th terminal or a "1"-st terminal depending on a value of a selection control signal (not illustrated) supplied from the CPU 14, and outputs a 2-bit signal received by the selected terminal. When the selector 33 selects the "1"-st terminal, a 2-bit signal representing "zero" (=0×0) is output. The 2-bit signal output from the selector 33 and the lower ten bits of the selected signal S1 are joined and sent to the dark level correction circuit 36.

The dark level correction circuit 36 functions to correct a gradation of a signal input to the dark level correction circuit 36 using a reference level held in an internal register (not illustrated), to make a dark level of the input signal equal to the reference level, and to output a resultant 12-bit signal to a 2-bit shift calculator (BS) 41 and a "0"-th terminal of the selector 44 in the next stage (FIG. 3). The 2-bit shift calculator 41 shifts the 12-bit signal transmitted from the dark level correction circuit 36 to the left by two bits, and outputs it to a "1"-st terminal of the selector 44. The selector 44 selects either the "0"-th terminal or the "1"-st terminal depending on a value of a selection control signal (not illustrated) supplied from the CPU 14, and outputs a signal received by the selected terminal, to the white balance correction circuit (WBC) 47. The white balance correction circuit (WBC) 47 corrects a tone of a signal which has been transmitted from the selector 44 in the preceding stage and input to the white balance correction circuit 47, using a reference value held in an internal register thereof (not illustrated), to make the tone of the signal equal to the reference value. Then, the white balance correction circuit 47 outputs the corresponding signal to the defective pixel correction circuit 50.

The defective pixel correction circuit 50 corrects an input signal associated with a defective pixel at a time when the control signal TS is supplied from the timing generator 52. An output signal of the defective pixel correction circuit 50 is subsampled by the subsampling circuit 60, and then sent to the RPU 13. It is noted that the subsampling circuit 60 can output an input signal to the RPU 13 without subsampling it, also.

The output signal of the subsampling circuit 60 is also input to a "1"-st terminal of the selector 62. The selector 62 selects either a "0"-th terminal or the "1"-st terminal depending on a value of a selection control signal (not illustrated) supplied from the CPU 14, and outputs a signal received by the selected terminal, to the RPU 13. Accordingly, by using the selector 62, it is possible to select either the G signal input to the "0"-th terminal of the selector 62 or the R signal input to the "1"-st signal of the selector 62, and send the selected signal to the RPU 13. In the present example, the G signal is selected in the selector 62 and sent to the RPU 13.

As for the 12-bit wide B signal TCCHB [11:0] input to the input terminal P7 of the SPU 12, the B signal is transmitted to a third phase adjustment circuit 23 illustrated in FIG. 2, first, and further transmitted to selectors 28 and 31 and a dark level correction circuit 37 illustrated in FIG. 2. Thereafter, the B signal is transmitted to a selector 45, a white balance correction circuit 48, a defective pixel correction circuit 51 and a subsampling circuit 61 illustrated in FIG. 3, and then is output to the RPU 13.

More specifically, the third phase adjustment circuit 23 samples the B signal TCCHB [11:0] transmitted from the input terminal P7 using the clock signals SPU2CK and SPUCK to adjust the phase of the B signal, and thereafter outputs the B signal to a "0"-th terminal of the selector 28. The selector 28 selects either the "0"-th terminal or a "1"-st terminal depending on a value of a selection control signal (not illustrated) supplied from the CPU 14, and outputs a signal received by the selected terminal, to a "0"-th terminal of the selector 31 in the next stage. In the present example, the selector 28 selects the "0"-th terminal and outputs the B signal input from the third phase adjustment circuit 23, to the selector 31.

The selector 31 selects either the "0"-th terminal or a "1"-st terminal depending on a value of a selection control signal (not illustrated) supplied from the CPU 14, and outputs a signal (selected signal) S2 received by the selected terminal. In the present example, the selector 31 selects the "0"-th terminal and outputs the signal transmitted from the selector 28 in the preceding stage, as the selected signal S2.

Then, upper two bits of the selected signal S2 are input to a "0"-th terminal of a selector 34, and lower ten bits of the selected signal S2 are input to the dark level correction circuit (DLC) 37. The selector 34 selects either the "0"-th terminal or a "1"-st terminal depending on a value of a selection control signal (not illustrated) supplied from the CPU 14, and outputs a 2-bit signal received by the selected terminal. When the selector 34 selects the "1"-st terminal, a 2-bit signal representing "zero" (=0x0) is output. The 2-bit signal output from the selector 34 and the lower ten bits of the selected signal S2 are joined and sent to the dark level correction circuit 37.

The dark level correction circuit 37 functions to correct a gradation of a signal input to the dark level correction circuit 37 using a reference level held in an internal register (not illustrated), to make a dark level of the input signal equal to the reference level, and to output a resultant 12-bit signal to a 2-bit shift calculator (BS) 42 and a "0"-th terminal of the selector 45 in the next stage (FIG. 3). The 2-bit shift calculator 42 shifts the 12-bit signal transmitted from the dark level correction circuit 37 to the left by two bits, and outputs it to a "1"-st terminal of the selector 45. The selector 45 selects either the "0"-th terminal or the "1"-st terminal depending on a value of a selection control signal (not illustrated) supplied from the CPU 14, and outputs a signal received by the selected terminal, to the white balance correction circuit (WBC) 48. The white balance correction circuit (WBC) 48 corrects a tone of a signal which has been transmitted from the selector 45 in the preceding stage and input to the white balance correction circuit 48, using a reference value held in an internal register thereof (not illustrated), to make the tone of the signal equal to the reference value. Then, the white balance correction circuit 48 outputs the corresponding signal to the defective pixel correction circuit 51.

The defective pixel correction circuit 51 corrects an input signal associated with a defective pixel at a time when the control signal TS is supplied from the timing generator 52. An output signal of the defective pixel correction circuit 51 is subsampled by the subsampling circuit 61, and then sent to the RPU 13. It is noted that the subsampling circuit 61 can output an input signal to the RPU 13 without subsampling it, also.

Processing on a YUV422 Signal

Next, processing on a 16-bit YUV signal performed by the SPU 12 (FIGS. 2 and 3) according to the first preferred embodiment will be described. The 16-bit YUV signal is a signal in a YUV422 format (YUV422 signal) in which a ratio of sampling rate (the number of samples per a given number of pixels) among a Y signal (luminance signal), a U signal (color difference signal) and a V signal (color difference signal) is 4:2:2. The 16-bit YUV signal includes an 8-bit Y signal and an 8-bit UV signal (a signal obtained by performing time division multiplexing on a U signal and a Y signal). The 8-bit UV signal is obtained by subsampling an 8-bit U signal and an 8-bit Y signal and multiplexing them.

A signal YUVI [15:12] composed of upper four bits of the 16-bit YUV signal is input to the input terminal P1, and a signal CCDD [11:0] composed of lower twelve bits of the 16-bit YUV signal is input to the input terminal P2. The signals YUVI [15:12] and CCDD [11:0] are joined and input to the separation circuit 20. Thus, the input terminal P2 is shared by the YUV signal and the above-described primary color, R, G, B, signals, which reduces the number of input pins provided in the input terminals as compared to a structure in which an input terminal dedicated to a YUV signal and input terminals dedicated to primary color, R, G, B, signals are provided.

The 16-bit wide YUV422 signal, after being input to the input terminals P1 and P2, is transmitted to the separation circuit 20. The separation circuit 20 samples the YUV422 signal to separate the YUV422 signal into an 8-bit Y signal and an 8-bit UV signal, and outputs the 8-bit Y signal and the 8-bit UV signal. Then, a 4-bit signal representing "zero" (=0b0000) is added, as upper four bits, to the 8-bit Y signal, so that the Y signal turns out to be a 12-bit signal, which is then transmitted to the "1"-st terminal of the selector 29. The UV signal is transmitted to an oversampling circuit 25. The oversampling circuit 25 oversamples the received UV signal, and outputs a result of the oversampling, i.e., an 8-bit U signal and an 8-bit V signal. Further, a 4-bit signal representing "zero" (=0b0000) is added, as upper four bits, to each of the U signal and the Y signal, so that each of the U signal and the Y signal turns out to be a 12-bit signal, which is then transmitted to the "1"-st terminals of the selectors 30 and 31.

Each of the selectors 29, 30 and 31 selects either the "0"-th terminal or the "1"-st terminal depending on a value of a common selection control signal (not illustrated) supplied from the CPU 14, and outputs the selected signal S0, S1 or S2 received by the selected terminal. In the present example, each of the selectors 29, 30 and 31 selects the "1"-st terminal, and the selectors 29, 30 and 31 output the Y signal, the U signal and the V signal, respectively.

The Y signal (the selected signal S0) output from the selector 29 is processed sequentially by the selector 32, the dark level correction circuit 35, the 2-bit shift calculator 40, the selector 43 and the defective pixel correction circuit 49 in the same manner as the color component signals for primary colors, R, G and B are processed. Thereafter, the Y signal is output to, and processed by, the AF evaluation value calculation circuit (AFC) 53, the pixel averaging circuit 54 and the subsampling circuits 55 and 59. In the present example, the selector 62 selects the "0"-th terminal and outputs the Y signal received from the subsampling circuit 59, to the RPU 13.

Likewise, the U signal (the selected signal S1) output from the selector 30 is processed sequentially by the selector 33, the dark level correction circuit 36, the 2-bit shift calculator 41, the selector 44, the white balance correction circuit 47, the defective pixel correction circuit 50 and the subsampling circuit 60, and thereafter output to the RPU 13. Further, the V signal (the selected signal S2) output from the selector 31 is likewise processed sequentially by the selector 34, the dark level correction circuit 37, the 2-bit shift calculator 42, the selector 45, the white balance correction circuit 48, the defective pixel correction circuit 51 and the subsampling circuit 61, and thereafter output to the RPU 13.

On the other hand, the Y signal and the UV signal output from the separation circuit 20 are joined and transmitted as a 16-bit YUV422 signal to the "1"-st terminal of the selector 57 (FIG. 3). The selector 57 outputs either a signal output from the selector 56 in the preceding stage or the YUV422 signal, to the output control circuit 58. The output control circuit 58 outputs a signal which should be subjected to DMA transfer, to the bus 16. Hence, by driving the selector 57 to select the "1"-st terminal, it is possible to accomplish output of the Y signal, the U signal and the V signal (YUV444 signal) to the RPU 13, in parallel with DMA transfer of the YUV422 signal on which no processing has been performed to another module. Since the YUV422 signal is not oversampled, an amount of transferred data for the YUV422 signal is smaller than an amount of transferred data for the YUV444 signal, which advantageously reduces a band occupied by the bus 16.

Processing on RAW Data Signal

The SPU 12 is capable of processing an output signal (RAW data signal) sent from the image sensor 11 of a single chip which includes a Bayer pattern color filter array. The RAW data signal includes pixels each of which has a single color component.

A 12-bit wide RAW data signal is input to the input terminal P2 and transmitted to the first phase adjustment circuit 21. The first phase adjustment circuit 21 samples the RAW data signal to adjust the phase of the RAW data signal, and thereafter outputs the RAW data signal to the selector 26. In the present example, the selector 26 selects the "0"-th terminal and outputs the RAW data signal received from the first phase adjustment circuit 21, to the selector 29, and the selector 29 selects the "0"-th terminal and outputs the RAW data signal received from the selector 26 in the preceding stage, as the selected signal S0.

Thereafter, a signal composed of upper two bits of the RAW data signal is transmitted to the "0"-th terminal of the selector 32, and a signal composed of lower ten bits of the RAW data signal is transmitted to the dark level correction circuit 35. The signal composed of the upper two bits of the RAW data signal which is output from the selector 32 and the signal composed of the lower ten bits of the RAW data signal are joined to turn out to be a 12-bit signal, which is then input to the dark level correction circuit 35.

The dark level correction circuit 35 has four operation modes (TC modes), and there are different reference values used for the four operation modes, respectively. In a first operation mode, processing on the color component signals for primary colors, R, G and B and the YUV signal are performed. In the second, third and fourth operation modes, processing on the RAW data signal is performed. In the RAW data signal, adjacent ones of pixels are different from each other in color of associated signal. For this reason, the dark level correction circuit 35 switches among the three operation modes for each pixel in accordance with a color of an input signal. For example, when an R signal and a G signal are alternately input (R signal, G signal, R signal, G signal, . . . ), respective operation modes for the R signal and the G signal are alternately selected.

A signal output from the dark level correction circuit 35 is transmitted to the 2-bit shift calculator 40 and the selector 43, and thereafter is input to the white balance correction circuit 46. The white balance correction circuit 46 has four operation modes (TC modes), similarly to the dark level correction circuit 35 as described above. The white balance correction circuit 46 likewise switches among the operation modes for each pixel in accordance with a color of an input signal.

A signal output from the white balance correction circuit 46 is transmitted to the defective pixel correction circuit 49 and to the subsampling circuit 55. Thereafter, the signal is input to the output control circuit 58 via the subsampling circuit 55 and the selectors 56 and 57, and is output to the bus 16 to be transferred. Meanwhile, the subsampling circuit 59 has four operation modes (TC modes) similarly to the dark level correction circuit 35, and switches among the operation modes for each pixel in accordance with a color of an input signal. A signal transmitted from the defective pixel correction circuit 49 to the subsampling circuit 59 is output to the RPU 13 via the subsampling circuit 59 and the selector 62.

As described above, the SPU 12 according to the first preferred embodiment is capable of processing various kinds of image signals, and thus has increased versatility.

Also, the three defective pixel correction circuits 49, 50 and 51 correct signals associated with one and the same defective pixel at the same time based on the common control signal TS supplied from the timing generator 52. Accordingly, there is no need of generating a timing for each of the defective pixel correction circuits. This reduces a volume of the defect correction data DCD and thus an amount of transferred data, which provides for improved efficiency in use of the bus 16. Further, there is no need of providing a timing generator for each of the defective pixel correction circuits. Hence, it is possible to reduce a circuit scale of the SPU 12 and suppress power consumption. Moreover, since the defect correction data DCD is transferred by a DMA method under control of the DMAC 17, a processing load of the CPU 14 is reduced, to thereby improve a processing efficiency. Also, a highly efficient data transfer can be achieved because only one DMA channel is required for transferring the defect correction data DCD.

2. Second Preferred Embodiment

In the first preferred embodiment, the structure of the SPU 12 for processing three kinds of signals has been described. However, the SPU 12 is capable of processing a further different kind of signal using a sampling circuit 24. According to a second preferred embodiment, the SPU 12 includes the sampling circuit 24 which is connected to other elements in the SPU 12 as illustrated in FIG. 2 and has a circuit structure illustrated in FIG. 4.

More specifically, according to the second preferred embodiment, the image sensor 11 generates a 12-bit signal for each color, i.e., a 12-bit G signal, a 12-bit R signal and a 12-bit B signal, and converts each of the color component signals into a serial sequence of signals each composed of six bits, to output the signals to the SPU 12. In other words, the image sensor 11 decomposes each of the 12-bit wide color component signals into 6-bit wide data signals, and performs time division multiplexing on the data signals, to provide multiplex signals CCDD [5:0], CCDD [11:6] and TCCHR [5:0] which are supplied to the SPU 12.

Figure 5:
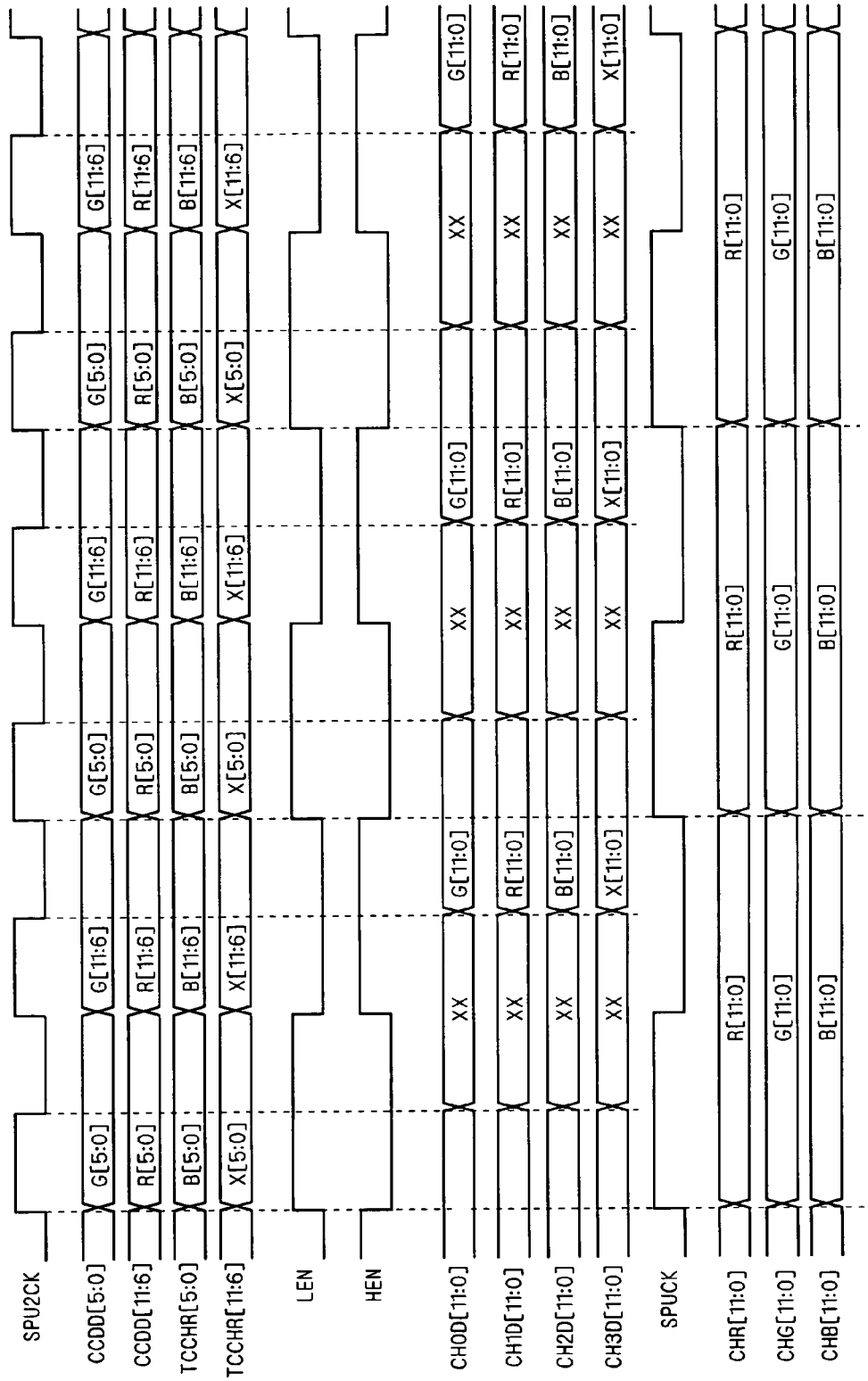
FIG. 5 is a timing chart showing waveforms of various signals exhibited in the sampling circuit according to the second preferred embodiment.

FIG. 5 is a timing chart which shows examples of waveforms of the multiplex signals CCDD [5:0], CCDD [11:6] and TCCHR [5:0]. The multiplex signal CCDD [5:0] is formed by decomposing the 12-bit G signal G [11:0] into a data signal G [5:0] composed of lower six bits of the G signal and a data signal G [11:6] composed of upper six bits of the G signal and performing time division multiplexing on the data signals. The multiplex signal CCDD [11:6] is formed by decomposing the 12-bit R signal R [11:0] into a data signal R [5:0] composed of lower six bits of the R signal and a data signal R [11:6] composed of upper six bits of the R signal and performing time division multiplexing on the data signals. The multiplex signal TCCHR [5:0] is formed by decomposing the 12-bit B signal B [11:0] into a data signal B [5:0] composed of lower six bits of the B signal and a data signal B [11:6] composed of upper six bits of the B signal, and performing time division multiplexing on the data signals. Each of the data signals on which time division multiplexing is performed is input in synchronization with the clock signal SPU2CK.

Figure 4:
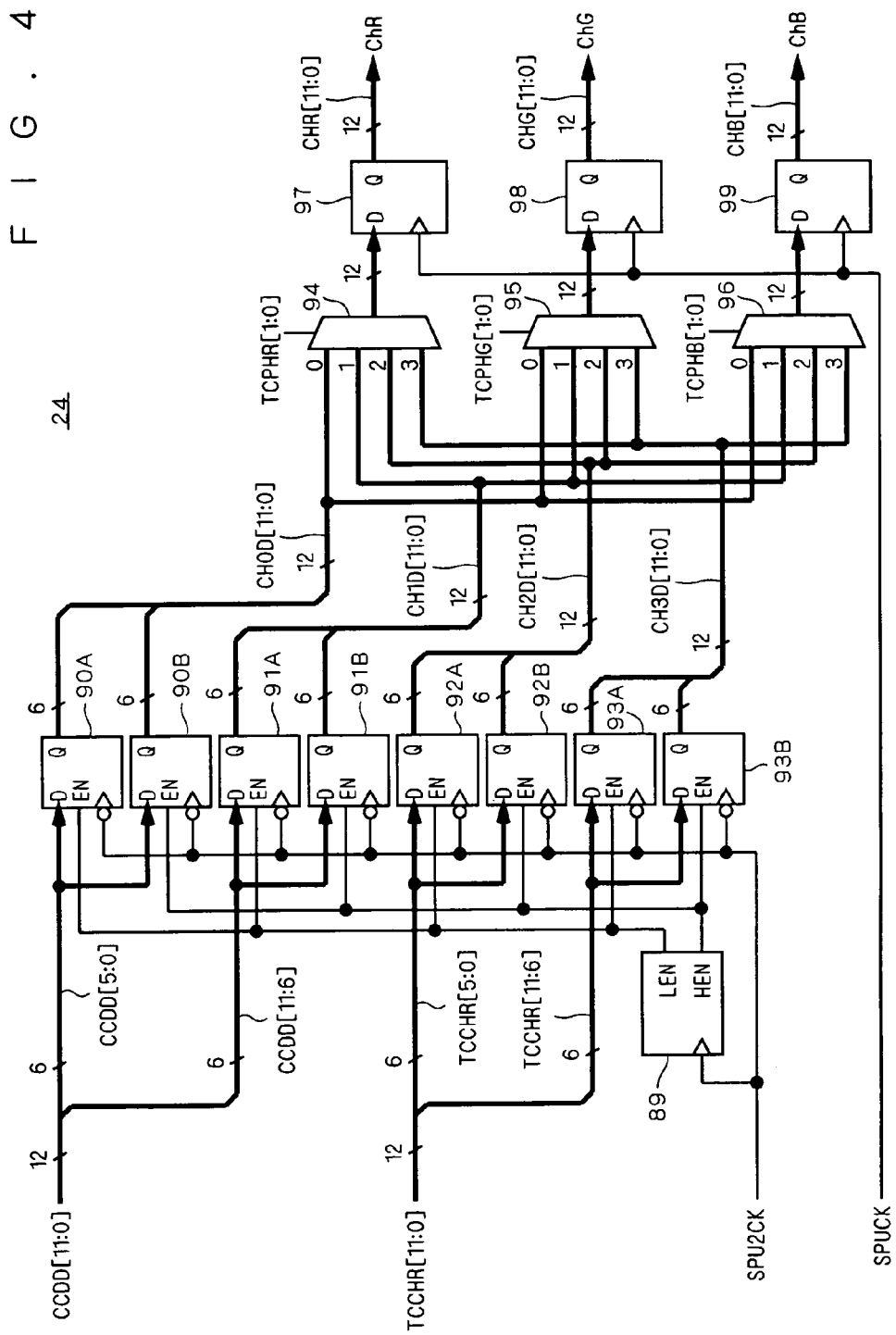
FIG. 4 schematically illustrates a structure of a sampling circuit of an SPU according to a second preferred embodiment of the present invention.

The sampling circuit 24 illustrated in FIG. 4 functions to sample and mix 6-bit wide multiplex signals using the clock signal SPUCK and the clock signal SPU2CK at a frequency which is twice a frequency of the clock signal SPUCK, to convert the 6-bit wide multiplex signals into 12-bit wide color component signals G [11:0], R [11:0] and B [11:0]. Below, the structure and operations of the sampling circuit 24 according to the second preferred embodiment will be described in detail with reference to FIGS. 4 and 5.

The sampling circuit 24 includes a timing controller 89, latch circuits 90A to 93A and 90B to 93B, first to third selectors 94, 95 and 96, and first to third registers 97, 98 and 99. The timing controller 89 divides the frequency of the clock signal SPU2CK by 2 to generate a low enable signal LEN, and sends the low enable signal LEN to enable terminals EN of the latch circuits 90A, 91A, 92A and 93A. Also, the timing controller 89 generates a high enable signal HEN which is 180° out of phase with the low enable signal LEN, and sends the high enable signal HEN to enable terminals EN of the latch circuits 90B, 91B, 92B and 93B.

Each of the latch circuits 90A to 93A and 90B to 93B latches a data signal input to a terminal D thereof and outputs the data signal from a terminal Q thereof at a falling edge of the clock signal SPU2CK in a period during which a signal input to the enable terminal EN is kept at a high level. More specifically, the latch circuits 90A, 91A, 92A and 93A latch the data signal G [5:0] (=CCDD [5:0]), the data signal R [5:0] (=CCDD [11:6]), the data signal B [5:0] (=TCCHR [5:0]), and a data signal X [5:0] (=TCCHR [11:6]), respectively, at a falling edge of the clock signal SPU2CK in a period during which the low enable signal LEN is kept at a high level. On the other hand, the latch circuits 90B, 91B, 92B and 93B latch the data signal G [11:6] (=CCDD [5:0]), the data signal R [11:6] (=CCDD [11:6]), the data signal B [11:6] (=TCCHR [5:0]), and a data signal X [11:6] (=TCCHR [11:6]) respectively, at a falling edge of the clock signal SPU2CK in a period during which the high enable signal HEN is kept at a high level. It is noted that each of the data signals X [5:0] and X [11:6] does not serve as a component signal for any color in the second preferred embodiment.

Then, the output signals of the latch circuits 90A and 90B are joined to be input as a 12-bit signal CH0D [11:0] to a "0"-th terminal of each of the first to third selectors 94, 95 and 96. The output signals of the latch circuits 91A and 91B are joined to be input as a 12-bit signal CH1D [11:0] to a "1"-st terminal of each of the first to third selectors 94, 95 and 96. The output signals of the latch circuits 92A and 92B are joined to be input as a 12-bit signal CH2D [11:0] to a "2"-nd terminal of each of the first to third selectors 94, 95 and 96. The output signals of the latch circuits 93A and 93B are joined to be input as a 12-bit signal CH3D [11:0] to a "3"-rd terminal of each of the first to third selectors 94, 95 and 96.

The first, second and third selectors 94, 95 and 96 receive 2-bit selection control signals TCPHR [1:0], TCPHG [1:0] and TCPHB [1:0], respectively, from the CPU 14. Then, each of the selectors selects one terminal among the "0"-th, "1"-st, "2"-nd, "3"-rd terminals thereof depending on a value of the received 2-bit selection control signal, and outputs a signal received by the selected terminal, to the register.

In an example given herein, the first selector 94 selects the "1"-st terminal and outputs an R signal, the second selector 95 selects the "0"-th terminal and outputs a G signal, and the third selector 96 selects the "2"-nd terminal and outputs a B signal. It is noted that data XX shown in FIG. 5 denotes data not selected by the first, second and third selectors 94, 95 and 96.

Then, the first, second and third registers 97, 98 and 99 latch signals received from the first, second and third selectors 94, 95 and 96, respectively, and output the received signals as an R signal R [11:0] (=CHR [11:0]), a G signal G [11:0] (=CHG [11:0]) and a B signal B [11:0] (=CHB [11:0]), respectively, at a rising edge of the clock signal SPUCK.

As described above, the sampling circuit 24 according to the second preferred embodiment functions to receive a transferred multiplex signal including a serial sequence of signals each composed of six bits, and to covert the multiplex signal into a 12-bit wide color component signal. Accordingly, to include the sampling circuit 24 according to the second preferred embodiment in the SPU 12 could significantly reduce the number of input pins provided in input terminals as compared to a structure in which a color component signal on which no processing has been performed is received. Thus, the SPU 12 can be implemented at a reduced scale.

Though the sampling circuit 24 according to the second preferred embodiment converts a 6-bit wide multiplex signal into a 12-bit wide color component signal, the present invention is not limited to such specific embodiments described above. It would be easy for those skilled in the art to structurally modify the sampling circuit 24 such that an $N_2$-bit ($N_2$ is a positive integer) wide multiplex signal can be converted into an $N_1$ (=$2 \times N_2$) bit wide color component signal.

Also, though the sampling circuit 24 according to the second preferred embodiment has a structure for converting multiplex signals into three color component signals G [11:0], R [11:0] and B [11:0], it would be easy for those skilled in the art to structurally modify the sampling circuit 24 such that multiplex signals can be converted into four color component signals. More specifically, the modification is accomplished by adding a further selector having the same structure as that of the first to third selectors 94, 95 and 96 and a further register having the same structure as that of the first to third registers 97, 98 and 99, to the sampling circuit 24.

3. Third Preferred Embodiment

Next, a third preferred embodiment of the present invention will be described. According to the third preferred embodiment, the SPU 12 includes the sampling circuit 24 which is connected to other elements in the SPU 12 as illustrated in FIG. 2 and has a circuit structure illustrated in FIG. 6. More specifically, according to the third preferred embodiment, the image sensor 11 generates a 12-bit signal for each color, i.e., a 12-bit G signal, a 12-bit R signal and a 12-bit B signal, and converts each of the color component signals into a serial sequence of signals each composed of four bits, to output the signals to the SPU 12. In other words, the image sensor 11 decomposes each of the 12-bit wide color component signals into 4-bit wide data signals, and performs time division multiplexing on the data signals, to provide multiplex signals CCDD [3:0], CCDD [7:4] and CCDD [11:8] which are supplied to the SPU 12.

Figure 7:
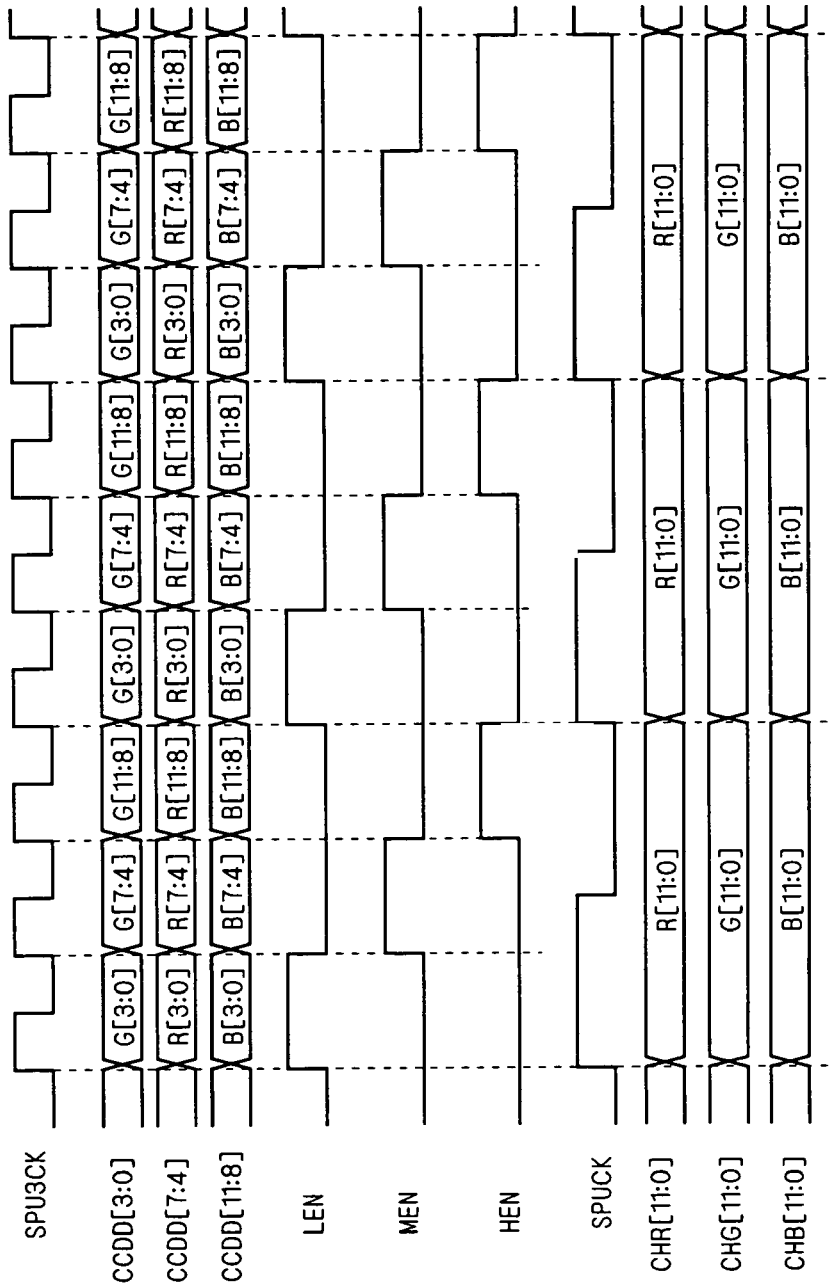
FIG. 7 is a timing chart showing waveforms of various signals exhibited in the sampling circuit according to the third preferred embodiment.

FIG. 7 is a timing chart which shows examples of waveforms of the multiplex signals CCDD [3:0], CCDD [7:4] and CCDD [11:8]. The multiplex signal CCDD [3:0] is formed by decomposing the 12-bit G signal G [11:0] into data signals G [3:0], G [7:4] and G [11:8] and performing multiplexing on the data signals. The multiplex signal CCDD [7:4] is formed by decomposing the 12-bit R signal R [11:0] into data signals R [3:0], R [7:4] and R [11:8] and performing multiplexing on the data signals. The multiplex signal CCDD [11:8] is formed by decomposing the 12-bit B signal B [11:0] into data signals B [3:0], B [7:4] and B [11:8] and performing multiplexing on the data signals. Each of the data signals on which multiplexing is performed is input in synchronization with a clock signal SPU3CK.

Figure 6:
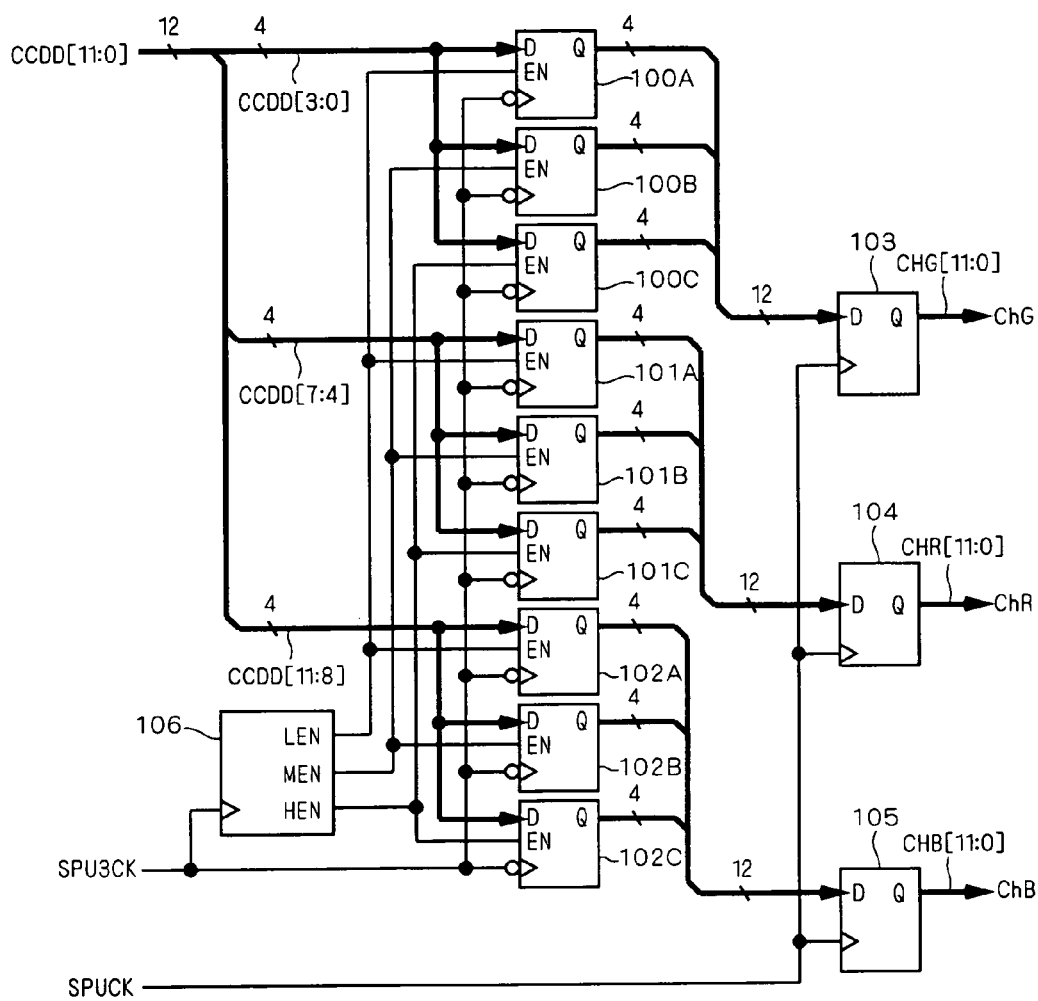
FIG. 6 schematically illustrates a structure of a sampling circuit of an SPU according to a third preferred embodiment of the present invention.

The sampling circuit 24 illustrated in FIG. 6 functions to sample and mix 4-bit wide multiplex signals using the clock signal SPUCK and the clock signal SPU3CK at a frequency which is three times a frequency of the clock signal SPUCK, to convert the 4-bit wide multiplex signals into 12-bit wide color component signals G [11:0], R [11:0] and B [11:0]. Below, the structure and operations of the sampling circuit 24 according to the third preferred embodiment will be described in detail with reference to FIGS. 6 and 7.

The sampling circuit 24 includes a timing controller 106, latch circuits 100A to 102A, 100B to 102B and 100C to 102C, and first to third selectors 103, 104 and 105. The timing controller 106 divides the frequency of the clock signal SPU3CK, to generate a first enable signal LEN, a second enable signal MEN and a third enable signal HEN. A pulse width of the first enable signal LEN corresponds to one cycle (=T) of the clock signal SPU3CK. A phase of the second enable signal MEN lags 1 cycle (=T) behind that of the first enable signal LEN, while a phase of the third enable signal HEN lags 2 cycles (=2×T) behind that of the first enable signal LEN. The first enable signal LEN is input to an enable terminal EN of each of the latch circuits 100A, 101A and 102A. The second enable signal MEN is input to an enable terminal EN of each of the latch circuits 100B, 101B and 102B. The third enable signal HEN is input to an enable terminal EN of each of the latch circuits 100C, 101C and 102C.

Each of the latch circuits 100A to 102A, 100B to 102B, and 100C to 102C latches a data signal input to a terminal D thereof and outputs the data signal from a terminal Q thereof at a falling edge of the clock signal SPU3CK in a period during which a signal input to the enable terminal EN is kept at a high level. More specifically, the latch circuits 100A, 101A and 102A latch the data signal G [3:0] (=CCDD [3:0]), the data signal R [3:0] (=CCDD [7:4]), and the data signal B [3:0] (=CCDD [11:8]), respectively, at a falling edge of the clock signal SPU3CK in a period during which the first enable signal LEN is kept at a high level. The latch circuits 100B, 101B and 102B latch the data signal G [7:4] (=CCDD [3:0]), the data signal R [7:4] (=CCDD [7:4]) and the data signal B [7:4] (=CCDD [11:8]), respectively, at a falling edge of the clock signal SPU3CK in a period during which the second enable signal MEN is kept at a high level. The latch circuits 100C, 101C and 102C latch the data signal G [11:8] (=CCDD [3:0]), the data signal R [11:8] (=CCDD [7:4]) and the data signal B [11:8] (=CCDD [11:8]), respectively, at a falling edge of the clock signal SPU3CK in a period during which the third enable signal HEN is kept at a high level.

Then, the output signals of the latch circuits 100A, 100B and 100C are joined to be input as a 12-bit signal to the first register 103. The output signals of the latch circuits 101A, 101B and 101C are joined to be input as a 12-bit signal to the second register 104. The output signals of the latch circuits 102A, 102B and 102C are joined to be input as a 12-bit signal to the third register 105.

The first, second and third registers 103, 104 and 105 latch the signals received from the latch circuits and output a G signal G [11:0] (=CHG [11:0]), an R signal R [11:0] (=CHR [11:0]) and a B signal B [11:0] (=CHB [11:0]), respectively, at a rising edge of the clock signal SPUCK.

As described above, the sampling circuit 24 according to the third preferred embodiment functions to receive a transferred multiplex signal including a serial sequence of signals each composed of four bits, and to covert the multiplex signal into a 12-bit wide color component signal. Accordingly, to include the sampling circuit 24 according to the third preferred embodiment in the SPU 12 could further significantly reduce the number of input pins provided in input terminals as compared to a structure in which a color component signal on which no processing has been performed is received. Thus, the SPU 12 can be implemented at a reduced scale.

Though the sampling circuit 24 according to the third preferred embodiment converts a 4-bit wide multiplex signal into a 12-bit wide color component signal, the present invention is not limited to such specific embodiment described above. It would be easy for those skilled in the art to structurally modify the sampling circuit 24 such that an $N_2$-bit ($N_2$ is a positive integer) wide multiplex signal can be converted into an $N_1$ (=3×$N_2$) bit wide color component signal.

4. Fourth Preferred Embodiment

Next, a fourth preferred embodiment of the present invention will be described. According to the fourth preferred embodiment, the SPU 12 includes the sampling circuit 24 which is connected to other elements in the SPU 12 as illustrated in FIG. 2 and has a circuit structure illustrated in FIG. 8. More specifically, according to the fourth preferred embodiment, the image sensor 11 generates a 12-bit signal for each color, i.e., a 12-bit G signal, a 12-bit R signal and a 12-bit B signal, and converts each of the color component signals into a serial sequence of signals each composed of three bits, to output the signals to the SPU 12. In other words, the image sensor 11 decomposes each of the 12-bit wide color component signals into 3-bit wide data signals, and performs time division multiplexing on the data signals, to provide multiplex signals CCDD [2:0], CCDD [5:3] and CCDD [8:6] which are supplied to the SPU 12.

Figure 9:
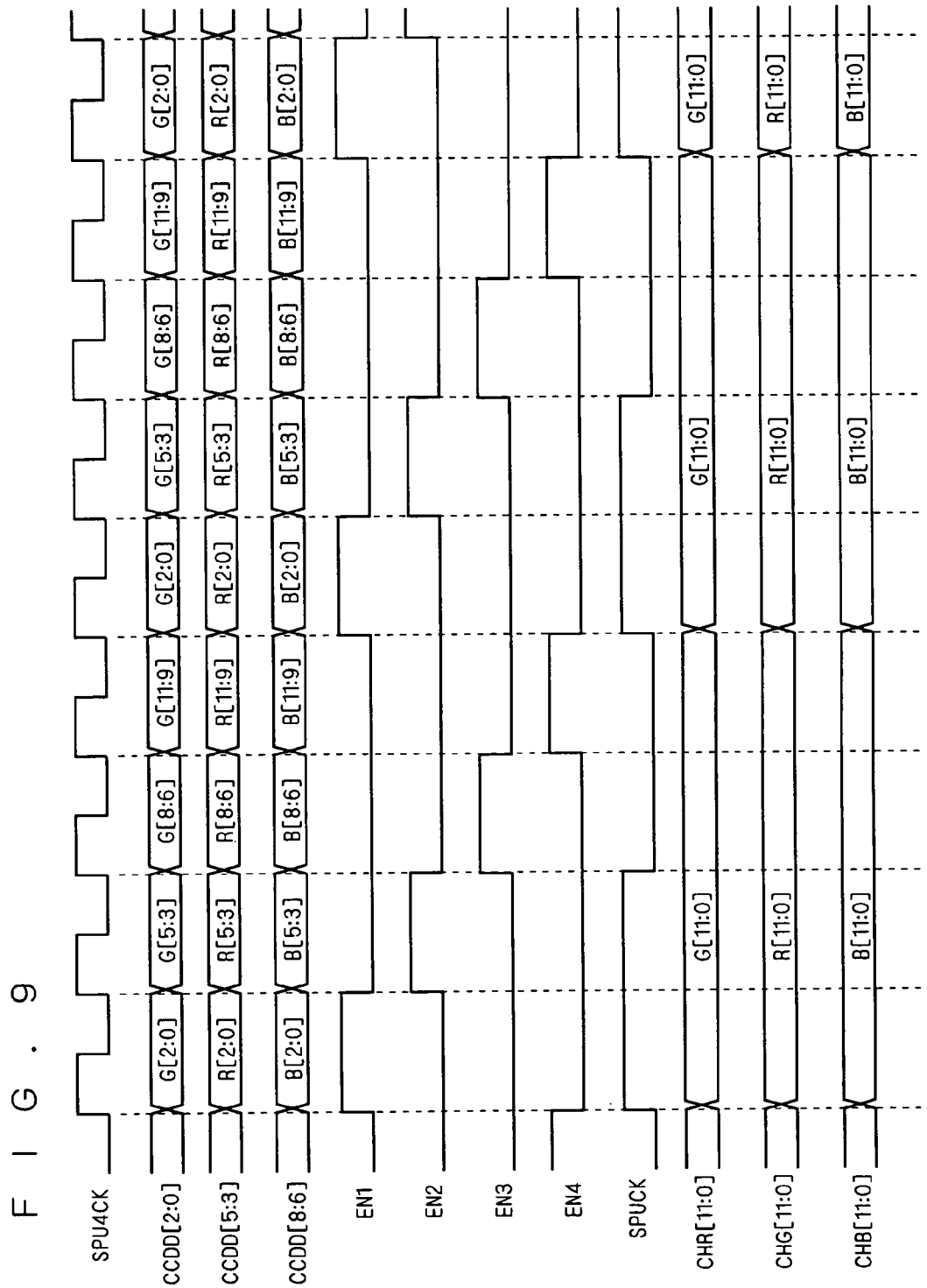
FIG. 9 is a timing chart showing waveforms of various signals exhibited in the sampling circuit according to the fourth preferred embodiment.

FIG. 9 is a timing chart which shows examples of waveforms of the multiplex signals CCDD [2:0], CCDD [5:3] and CCDD [8:6]. The multiplex signal CCDD [2:0] is formed by decomposing the 12-bit G signal G [11:0] into data signals G [2:0], G [5:3], G [8:6] and G [11:9] and performing multiplexing on the data signals. The multiplex signal CCDD [5:3] is formed by decomposing the 12-bit R signal R [11:0] into data signals R [2:0], R [5:3], R [8:6] and R [11:9] and performing multiplexing on the data signals. The multiplex signal CCDD [8:6] is formed by decomposing the 12-bit B signal B [11:0] into data signals B [2:0], B [5:3], B [8:6] and B [11:9] and performing multiplexing on the data signals. Each of the data signals on which multiplexing is performed is input in synchronization with a clock signal SPU4CK.

The sampling circuit 24 illustrated in FIG. 8 functions to sample and mix 3-bit wide multiplex signals using the clock signal SPUCK and the clock signal SPU4CK at a frequency which is four times a frequency of the clock signal SPUCK, to convert the 3-bit wide multiplex signals into 12-bit wide color component signals G [11:0], R [11:0] and B [11:0]. Below, the structure and operations of the sampling circuit 24 according to the fourth preferred embodiment will be described in detail with reference to FIGS. 8 and 9.

The sampling circuit 24 includes a timing controller 116, latch circuits 110A to 112A, 110B to 112B, 110C to 112C and 110D to 112D, and first to third registers 113, 114 and 115. The timing controller 116 divides the frequency of the clock signal SPU4CK, to generate a first enable signal EN1, a second enable signal EN2, a third enable signal EN3 and a fourth enable signal EN4. A pulse width of the first enable signal EN1 corresponds to one cycle (=$T_K$) of the clock signal SPU4CK. A phase of the second enable signal EN2 lags 1 cycle (=1×$T_K$) behind that of the first enable signal EN1. A phase of the third enable signal EN3 lags 2 cycles (=2×$T_K$) behind that of the first enable signal EN1. A phase of the fourth enable signal EN4 lags 3 cycles (=3×$T_K$) behind that of the first enable signal EN1. The first enable signal EN1 is input to an enable terminal EN of each of the latch circuits 110A, 111A and 112A. The second enable signal EN2 is input to an enable terminal EN of each of the latch circuits 110B, 111B and 112B. The third enable signal EN3 is input to an enable terminal EN of each of the latch circuits 110C, 111C and 112C. The fourth enable signal EN4 is input to an enable terminal EN of each of the latch circuits 110D, 111D and 112D.

Each of the latch circuits 110A to 112A, 110B to 112B, 110C to 112C and 110D to 112D latches a data signal input to a terminal D thereof and outputs the data signal from a terminal Q thereof at a falling edge of the clock signal SPU4CK in a period during which a signal input to the enable terminal EN is kept at a high level. More specifically, the latch circuits 110A, 111A and 112A latch the data signal G [2:0] (=CCDD [2:0]), the data signal R [2:0] (=CCDD [5:3]), and the data signal B [2:0] (=CCDD [8:6]), respectively, at a falling edge of the clock signal SPU4CK in a period during which the first enable signal EN1 is kept at a high level. The latch circuits 110B, 111B and 112B latch the data signal G [5:3] (=CCDD [2:0]), the data signal R [5:3] (=CCDD [5:3]) and the data signal B [5:3] (=CCDD [8:6]), respectively, at a falling edge of the clock signal SPU4CK in a period during which the second enable signal EN2 is kept at a high level. The latch circuits 110C, 111C and 112C latch the data signal G [8:6] (=CCDD [2:0]), the data signal R [8:6] (=CCDD [5:3]) and the data signal B [8:6] (=CCDD [8:6]), respectively, at a falling edge of the clock signal SPU4CK in a period during which the third enable signal EN3 is kept at a high level. The latch circuits 110D, 111D and 112D latch the data signal G [11:9] (=CCDD [2:0]), the data signal R [11:9] (=CCDD [5:3]) and the data signal B [11:9] (=CCDD [8:6]), respectively, at a falling edge of the clock signal SPU4CK in a period during which the fourth enable signal EN4 is kept at a high level.

Then, the output signals of the latch circuits 110A, 110B, 110C and 110D are joined to be input as a 12-bit signal to the first register 113. The output signals of the latch circuits 111A, 111B, 111C and 11D are joined to be input as a 12-bit signal to the second register 114. The output signals of the latch circuits 112A, 112B, 112C and 112D are joined to be input as a 12-bit signal to the third register 115.

The first, second and third registers 113, 114 and 115 latch the signals received from the latch circuits and output a G signal G [11:0] (=CHG [11:0]), an R signal R [11:0] (=CHR [11:0]) and a B signal B [11:0] (=CHB [11:0]), respectively, at a rising edge of the clock signal SPUCK.

As described above, the sampling circuit 24 according to the fourth preferred embodiment functions to receive a transferred multiplex signal including a serial sequence of signals each composed of three bits, and to covert the multiplex signal into a 12-bit wide color component signal. Accordingly, to include the sampling circuit 24 according to the fourth preferred embodiment in the SPU 12 could further significantly reduce the number of input pins provided in input terminals as compared to a structure in which a color component signal on which no processing has been performed is received. Thus, the SPU 12 can be implemented at a reduced scale.

Though the sampling circuit 24 according to the fourth preferred embodiment converts a 3-bit wide multiplex signal into a 12-bit wide color component signal, the present invention is not limited to such specific embodiment described above. It would be easy for those skilled in the art to structurally modify the sampling circuit 24 such that an $N_2$-bit ($N_2$ is a positive integer) wide multiplex signal can be converted into an $N_1$ (=4×$N_2$) bit wide color component signal.

5. Fifth Preferred Embodiment

Next, a fifth preferred embodiment of the present invention will be described. According to the fifth preferred embodiment, the SPU 12 includes the sampling circuit 24 which is connected to other elements in the SPU 12 as illustrated in FIG. 2 and has a circuit structure illustrated in FIG. 10. More specifically, according to the fifth preferred embodiment, the image sensor 11 generates a 12-bit signal for each color, i.e., a 12-bit G signal, a 12-bit R signal and a 12-bit B signal, and performs time division multiplexing on the color component signals, to provide a multiplex signal which is output to the SPU 12. FIG. 11 is a timing chart which shows an example of a waveform of a multiplex signal CCDD [11:0]. In FIG. 11, "R", "G" and "B" denote an R signal, a G signal and a B signal, respectively, while "X" does not denote any color component signal (which will hereinafter be referred to as an "X signal"). The multiplex signal is input in synchronization with the clock signal SPU4CK.

Figure 10:
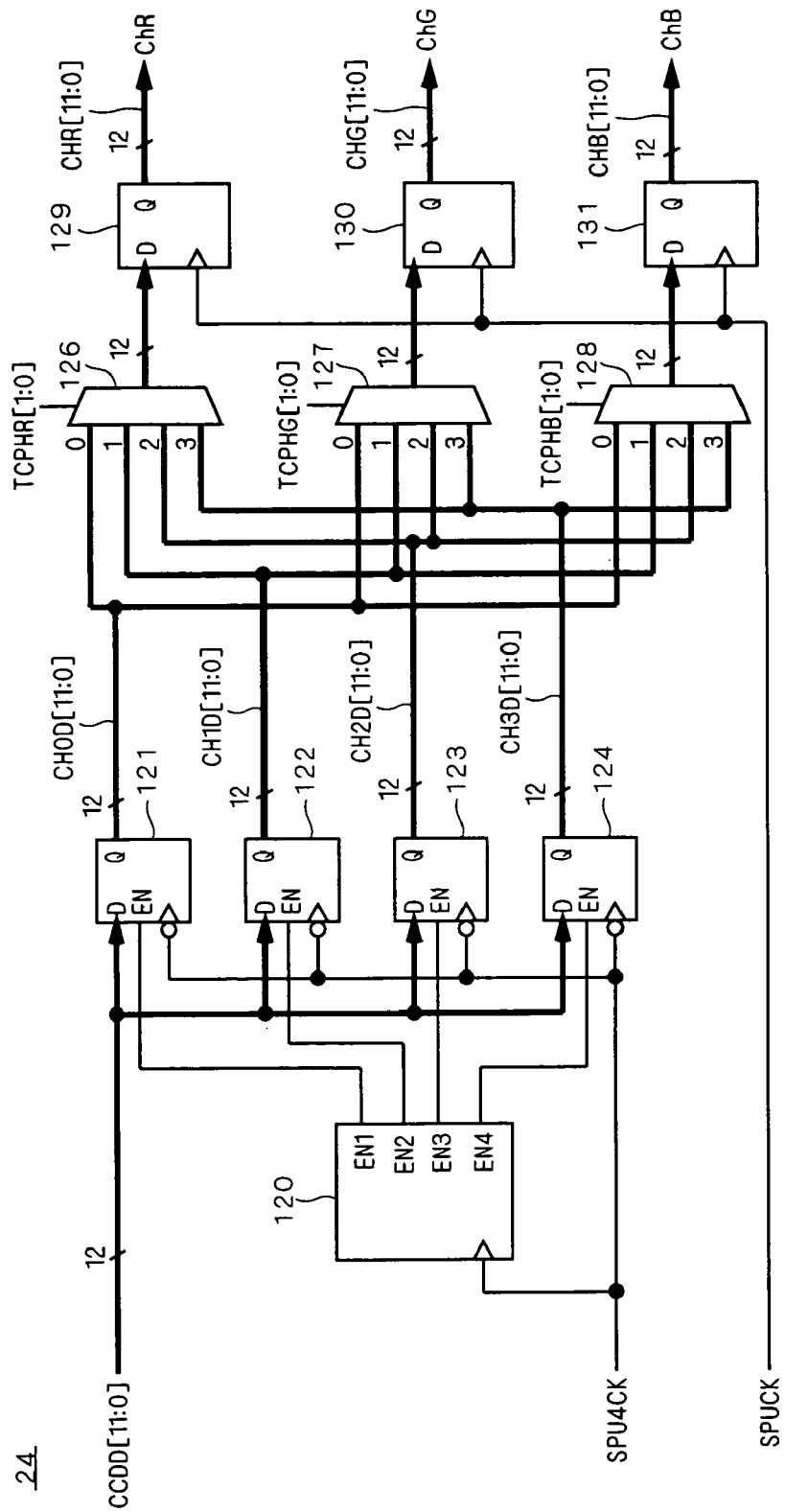
FIG. 10 schematically illustrates a structure of a sampling circuit of an SPU according to a fifth preferred embodiment of the present invention.
Figure 11:
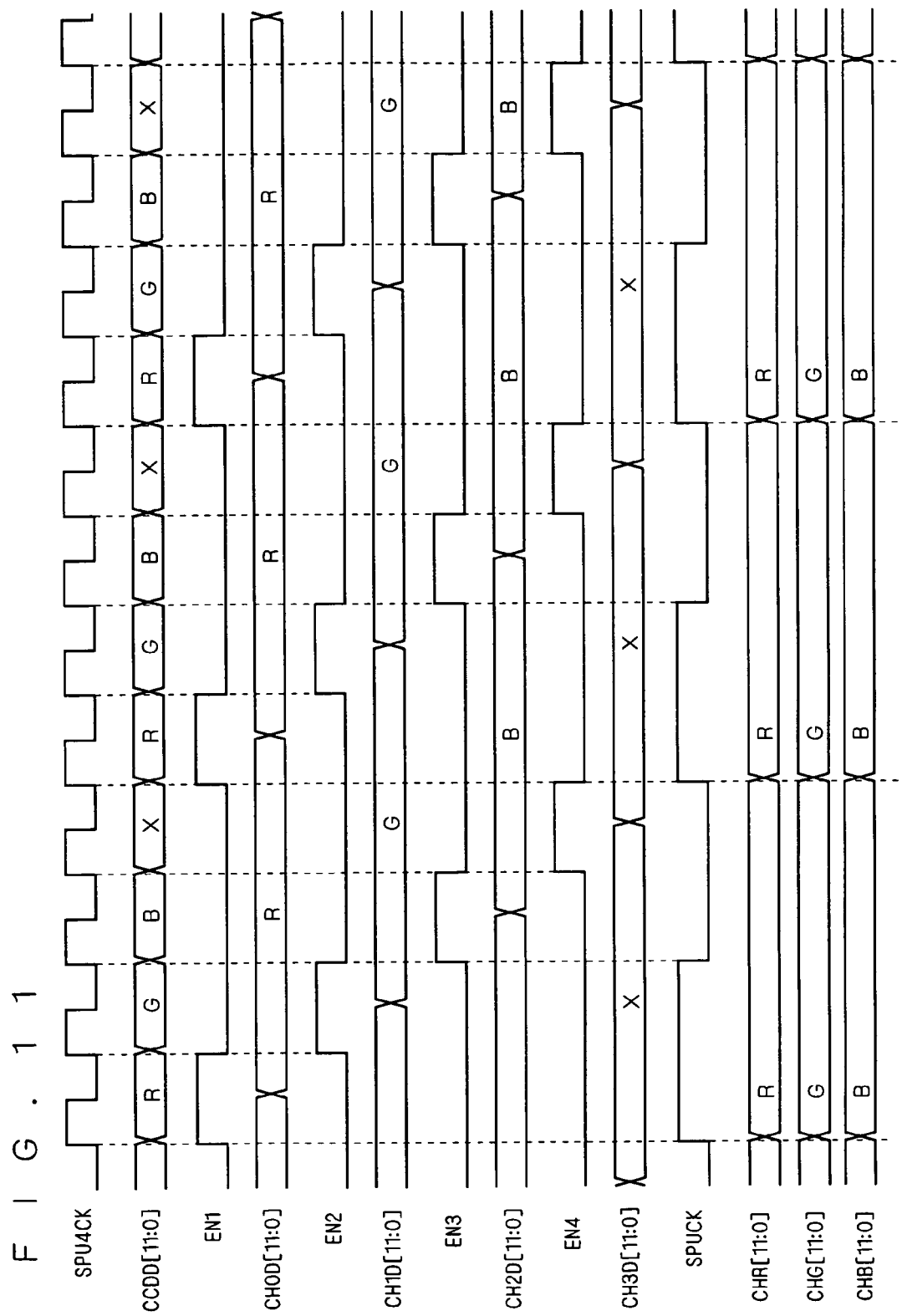
FIG. 11 is a timing chart showing waveforms of various signals exhibited in the sampling circuit according to the fifth preferred embodiment.

The sampling circuit 24 illustrated in FIG. 10 functions to sample the multiplex signal CCDD [11:0] and output results in parallel, using the clock signal SPUCK and the clock signal SPU4CK at a frequency which is four times that of the clock signal SPUCK. Below, the structure and operations of the sampling circuit 24 according to the fifth preferred embodiment will be described in detail with reference to FIGS. 10 and 11.

The sampling circuit 24 includes a timing controller 120, latch circuits 121 to 124, first to third selectors 126, 127 and 128, and first to third registers 129, 130 and 131. The timing controller 120 divides the frequency of the clock signal SPU4CK, to generate a first enable signal EN1, a second enable signal EN2, a third enable signal EN3 and a fourth enable signal EN4. A pulse width of the first enable signal EN1 corresponds to one cycle (=$T_K$) of the clock signal SPU4CK. A phase of the second enable signal EN2 lags 1 cycle (=1×$T_K$) behind that of the first enable signal EN1. A phase of the third enable signal EN3 lags 2 cycles (=2×$T_K$) behind that of the first enable signal EN1. A phase of the fourth enable signal EN4 lags 3 cycles (=3×$T_K$) behind that of the first enable signal EN1. The first, second, third and fourth enable signals EN1, EN2, EN3 and EN4 are input to respective enable terminals EN of the latch circuits 121, 122, 123 and 124, respectively.

Each of the latch circuits 121, 122, 123 and 124 latches a signal input to a terminal D thereof and outputs the signal from a terminal Q thereof at a falling edge of the clock signal SPU4CK in a period during which a signal input to the enable terminal EN is kept at a high level. More specifically, the latch circuit 121 latches the R signal CH0D [11:0] in the multiplex signal and outputs the R signal to a "0"-th terminal of each of the first, second and third selectors 126, 127 and 128 at a falling edge of the clock signal SPU4CK in a period during which the first enable signal EN1 is kept at a high level. The latch circuit 122 latches the G signal CH1D [11:0] and outputs the G signal to a "1"-st terminal of each of the first, second and third selectors 126, 127 and 128 at a falling edge of the clock signal SPU4CK in a period during which the second enable signal EN2 is kept at a high level. The latch circuit 123 latches the B signal CH2D [11:0] and outputs the B signal to a "2"-nd terminal of each of the first, second and third selectors 126, 127 and 128 at a falling edge of the clock signal SPU4CK in a period during which the third enable signal EN3 is kept at a high level. The latch circuit 124 latches the X signal CH3D [11:0] and outputs the X signal to a "3"-rd terminal of each of the first, second and third selectors 126, 127 and 128 at a falling edge of the clock signal SPU4CK in a period during which the fourth enable signal EN4 is kept at a high level.

The first, second and third selectors 126, 127 and 128 receive 2-bit selection control signals TCPHR [1:0], TCPHG

[1:0] and TCPHB [1:0], respectively, from the CPU 14. Then, each of the selectors selects one terminal among the "0"-th, "1"-st, "2"-nd and "3"-rd terminals thereof depending on a value of the received 2-bit selection control signal, and outputs a signal received by the selected terminal, to the register. In an example given herein, the first selector 126 selects the "0"-th terminal, the second selector 127 selects the "1"-st terminal, and the third selector 128 selects the "2"-nd terminal. Then, the first, second and third registers 129, 130 and 131 latch signals output from the first, second and third selectors 126, 127 and 128, respectively, and output the signals as an R signal CHR [11:0], a G signal CHG [11:0] and a B signal CHB [11:0], respectively, at a rising edge of the clock signal SPUCK.

As described above, the sampling circuit 24 according to the fifth preferred embodiment functions to separate a plurality of multiplex color component signals and output its results in parallel. Accordingly, to include the sampling circuit 24 according to the fifth preferred embodiment in the SPU 12 would allow the SPU 12 to perform parallel processing on a plurality of color component signals. Further, the number of input pins provided in input terminals can be significantly reduced as compared to a structure in which a color component signal on which no processing has been performed is received. Thus, the SPU 12 can be implemented at a reduced scale.

Though the sampling circuit 24 according to the fifth preferred embodiment converts a 12-bit wide multiplex signal into a 36-bit wide signal including 12-bit wide signals which are parallel with one another, the present invention is not limited to such specific embodiment described above. It would be easy for those skilled in the art to structurally modify the sampling circuit 24 such that an $N_1$-bit ($N_1$ is a positive integer) wide multiplex signal can be converted into an $N_2$-bit ($N_2$ is a positive integral multiple of $N_1$) wide signal including $N_1$-bit wide signals which are parallel with one another. Examples of modified structures which are most likely to be reduced to practice include a structure which allows a multiplex signal to be separated into four color component signals under a condition that $N_2$ is four times as large as $N_1$ as in the above-described fifth preferred embodiment, and a structure which allows a multiplex signal to be separated into three color component signals under a condition that $N_2$ is three times as large as $N_1$.

6. Sixth Preferred Embodiment

Figure 12:
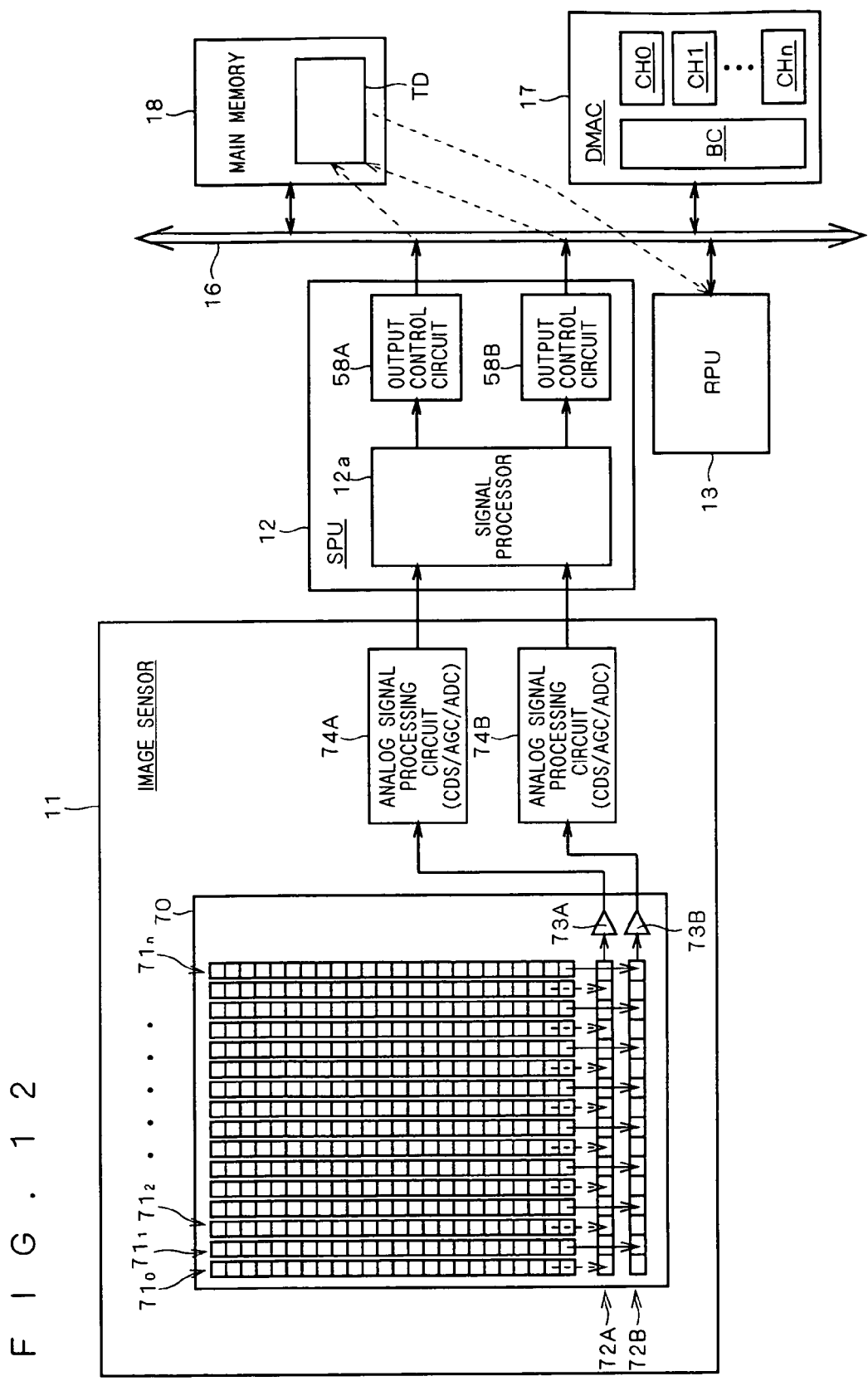
FIG. 12 is a block diagram schematically illustrating a structure of an image processing system according to a sixth preferred embodiment of the present invention.

Next, a sixth preferred embodiment of the present invention will be described. FIG. 12 is a block diagram schematically illustrating an image processing system according to the sixth preferred embodiment. The image processing system illustrated in FIG. 12 includes the SPU 12, the bus 16, the main memory 18 and the DMAC 17.

The SPU 12 includes a signal processor 12*a* for performing parallel processing on two image signals which are read out in parallel from the image sensor 11, and two output control circuits 58A and 58B. The signal processor 12*a* includes the structure illustrated in FIGS. 2 and 3 and described in the first preferred embodiment. The SPU 12 according to the sixth preferred embodiment includes the two output control circuits 58A and 58B in addition to the signal processor 12*a* (the structure illustrated in FIGS. 2 and 3). The SPU according to the sixth preferred embodiment can be implemented by employing the output control circuit 58 illustrated in FIG. 3 as the output control circuit 58A and providing the output control circuit 58B configured so as to receive a result output from the subsampling circuit 60 illustrated in FIG. 3.

According to the sixth preferred embodiment, the image sensor 11 includes a light receiving circuit 70 including a CCD, a first analog signal processing circuit 74A and a second analog signal processing circuit 74B. The light receiving circuit 70 includes lines of vertical transfer parts $71_0$ to $71_n$ (n is an integer equal to or larger than 3), a first horizontal transfer part 72A, a first amplifier 73A, a second horizontal transfer part 72B and a second amplifier 73B.

A photodiode (not illustrated) of the light receiving circuit 70 photoelectrically converts an incident light to generate carriers (electric charge or hole). The vertical transfer parts $71_0$ to $71_n$ receive the carriers generated by the photodiode, and transfer the carriers, as signals, to the first horizontal transfer part 72A and the second horizontal transfer part 72B. More specifically, out of all the vertical transfer parts $71_0$ to $71_n$, each of vertical transfer parts $71_0$, $71_2$, ... in even lines transfers a signal to the first horizontal transfer part 72A, while each of vertical transfer parts $71_1$, $71_3$, ... in odd lines transfers a signal to the second horizontal transfer part 72B. As such, the light receiving circuit 70 includes two light receivers including a group of the vertical transfer parts $71_0$, $71_2$, ... in even lines and a group of the vertical transfer parts $71_1$, $71_3$, ... in odd lines, respectively. Carriers (signals) respectively generated in the two light receivers are transferred to the first horizontal transfer part 72A and the second horizontal transfer part 72B, respectively, and further transferred to the first amplifier 73A and the second amplifier 73B, respectively, in a horizontal direction. The first amplifier 73A and the second amplifier 73B amplify the transferred signals, and output the amplified signals to the first analog signal processing circuit 74A and the second analog signal processing circuit 74B, respectively. Then, the first analog signal processing circuit 74A and the second analog signal processing circuit 74B perform CDS processing, AGC processing and A/D conversion on the signals output from the first and second amplifiers 73A and 73B, respectively, and output digital image signals to the SPU 12.

Further, in the SPU 12, the digital image signals are first received by the signal processor 12*a* from the first and second analog signal processing circuits 74A and 74B, and then input to the output control circuits 58A and 58B. Thereafter, the digital image signals are transferred to the main memory 18 via the bus 16 under control of the DMAC 17. At that time, the DMAC 17 assigns the DMA channel CH0 to data transfer between the output control circuit 58A and the main memory 18, while assigning the DMA channel CH1 to data transfer between the output control circuit 58B and the main memory 18. Then, the digital image signals transferred to, and stored in, the main memory 18 are read out from the main memory 18, as image data TD, which is subsequently transferred to the RPU 13 and processed.

As described above, according to the sixth preferred embodiment, the SPU 12 is capable of processing two image signals in parallel and transferring the two image signals in parallel to another module via the bus 16. This allows for highly efficient image processing. In transferring two image signals, if the SPU 12 includes only the output control circuit 58A, one of the two image signals should be buffered while the other of the two image signals is being transferred by the output control circuit 58A, to additionally require a line memory for buffering. In contrast, according to the sixth preferred embodiment, parallel DMA transfer of two image signals is possible and thus a line memory is not required.

It is noted that though the SPU 12 includes the two output control circuits 58A and 58B according to the sixth preferred embodiment, alternatively an output control circuit of the RPU 13 may be employed as the output control circuit 58B.

To this end, the selector 62 in FIG. 3 is driven to select the "1"-st terminal, to thereby cause a signal output from the subsampling circuit 60 to be transferred to the RPU 13, so that the signal can be transferred to the main memory 18 via the output control circuit of the RPU 13.

7. Seventh Preferred Embodiment

Figure 13:
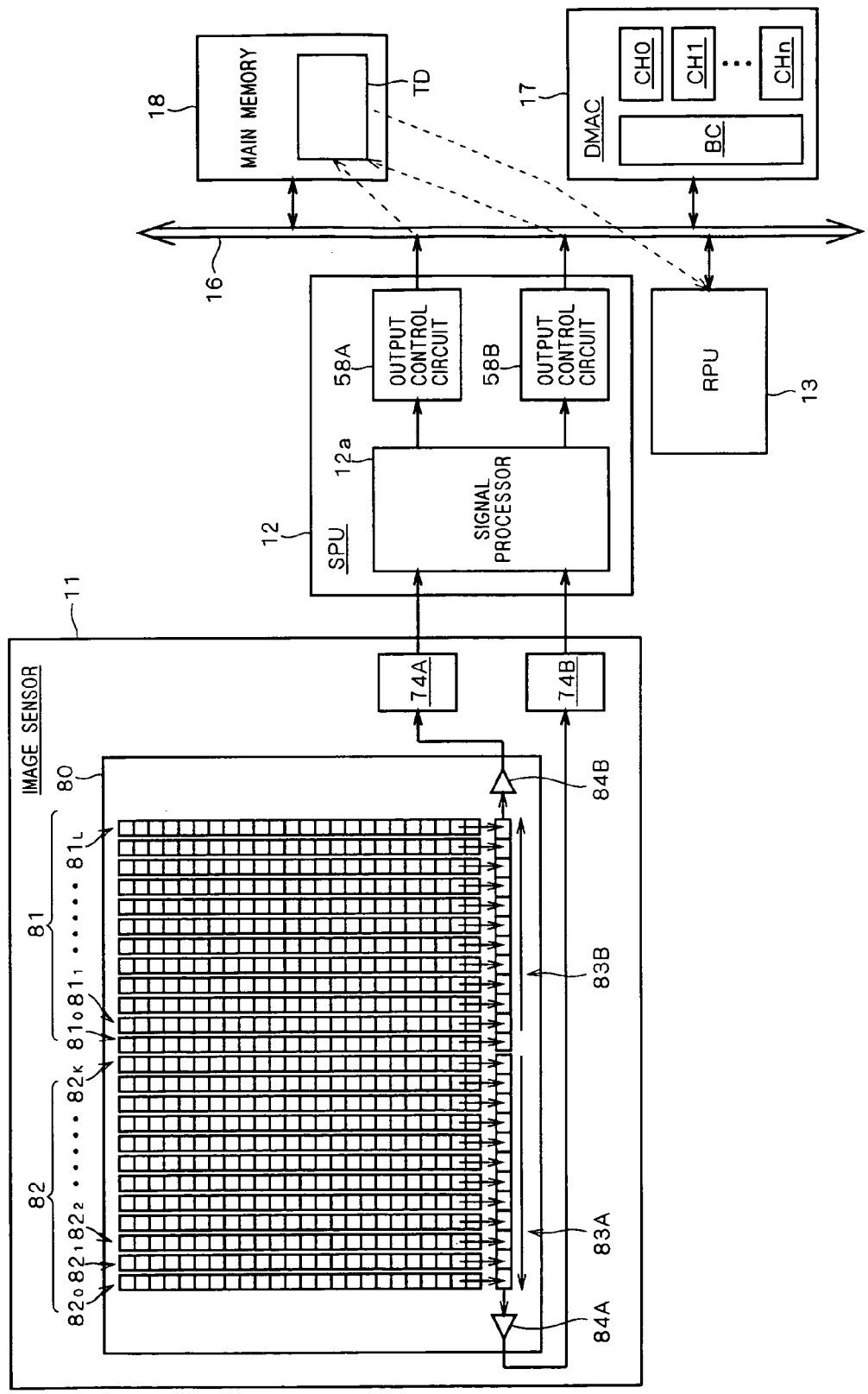
FIG. 13 is a block diagram schematically illustrating a structure of an image processing system according to a seventh preferred embodiment of the present invention.

Next, a seventh preferred embodiment of the present invention will be described. FIG. 13 is a block diagram schematically illustrating an image processing system according to the seventh preferred embodiment of the present invention. The image processing system according to the seventh preferred embodiment includes the SPU 12 and the DMAC 17. Respective structures of the SPU 12 and the DMAC 17 are identical to those illustrated in FIG. 12. Also, according to the seventh preferred embodiment, a structure of the image sensor 11 is substantially identical to that illustrated in FIG. 12 except for a structure of a light receiving circuit 80.

The light receiving circuit 80 according to the seventh preferred embodiment includes a first light receiver 81 and a second light receiver 82 which are structurally distinct from each other. The first light receiver 81 includes L+1 (L is a positive integer) lines of vertical transfer parts $81_0$ to $81_L$. The second light receiver 82 includes K+1 (K is a positive integer) lines of vertical transfer parts $82_0$ to $82_K$.

A photodiode (not illustrated) of each of the first light receiver 81 and the second light receiver 82 photoelectrically converts an incident light to generate carriers. The vertical transfer parts $81_0$ to $81_L$ of the first light receiver 81 receive the generated carriers, and transfer the carriers, as signals, to a first horizontal transfer part 83B. Also, the vertical transfer parts $82_0$ to $82_K$ of the second light receiver 82 receive the generated carriers, and transfer the carriers, as signals, to a second horizontal transfer part 83A. Subsequently, the first horizontal transfer part 83B transfers the received signals to a first amplifier 84B, which then amplifies the signals and outputs the amplified signals to the first analog signal processing circuit 74A. Also, the second horizontal transfer part 83A transfers the received signals to a second amplifier 84A, which then amplifies the signals and outputs the amplified signals to the second analog signal processing circuit 74B. As a result, two digital image signals are sent in parallel, to the signal processor 12a of the SPU 12.

The first horizontal transfer part 83B and the second horizontal transfer part 83A are advantageous over the first horizontal transfer part 72A and the second horizontal transfer part 72B of the image sensor 11 illustrated in FIG. 12 in that the number of stages necessary for signal transfer is reduced approximately by half. In a recently developed high resolution imaging device, the number of stages of horizontal transfer parts is very large in order to increase resolution in a horizontal direction. However, the large number of horizontal transfer parts causes a problem of increasing difficulties in high speed signal transfer. In this regard, the structure of the light receiving circuit 80 according to the seventh preferred embodiment in which the number of stages necessary for signal transfer is reduced as noted above overcomes the foregoing problem. Nonetheless, as signals are read out from the first light receiver 81 in a direction opposite to a direction in which signals are read out from the second light receiver 82, there is a need of changing an order of signals read out from one of the first and second light receivers 81 and 82 so that two orders of signals read out from the first and second light receivers 81 and 82, respectively, are identical to each other. As diagrammatically shown in FIG. 14, an image signal 90 read out from the light receiving circuit 80 includes image signals 90B on the right-hand side of the figure which are read out from the first light receiver 81 in one scanning direction, and image signals 90A on the left-hand side of the figure which are read out from the second light receiver 82 in another scanning direction. It is appreciated from FIG. 14 that respective scanning directions denoted by arrows in FIG. 14 of the first and second light receivers 81 and 82 are opposite to each other.

In view of the foregoing, according to the seventh preferred embodiment, in transferring two image signals output from the output control circuits 58A and 58B to the main memory 18, an order of write addresses of one of the two image signals is made reverse relative to an order of write addresses of the other of the two image signals. More specifically, the DMAC 17 assigns the DMA channel CH0 to data transfer between the output control circuit 58A and the main memory 18, and assigns the DMA channel CH1 to data transfer between the output control circuit 58B and the main memory 18. Then, the DMA channel CH0 makes an order of write addresses of one of the two image signals reverse relative to an order of write addresses of the other of the two image signals which are generated by the DMA channel CH1. In this manner, as diagrammatically shown in FIG. 15, an order of image signals 91A on the left-hand side of the figure can be made identical to an order of image signals 91B on the right-hand side of the figure.

As describe above, according to the seventh preferred embodiment, a step of changing an order of arrangement of image signals in one of right and left sections forming the image data TD transferred from the SPU 12 to the main memory 18 can be omitted, so that high speed image processing can be implemented.

While the invention has been shown and described in detail, the foregoing description is in all aspects illustrative and not restrictive. It is therefore understood that numerous modifications and variations can be devised without departing from the scope of the invention.

What is claimed is:

1. An image processing apparatus comprising:
    an input terminal for receiving a plurality of color component signals output in parallel from an image sensor;
    a plurality of defective pixel correction circuits for correcting said plurality of color component signals associated with a defective pixel of said image sensor with a predetermined timing; and
    a defective pixel correction timing generator for generating said predetermined timing used in performing defective pixel correction at a time of input of said plurality of color component signals, wherein
    said plurality of defective pixel correction circuits correct said plurality of color component signals in parallel at the same time with said predetermined timing, all of said plurality of color component signals being associated with said defective pixel.

2. The image processing apparatus according to claim 1, wherein
    said defective pixel correction timing generator generates said predetermined timing based on defect correction data transferred from a memory by a DMA (direct memory access) controller.

3. An image processing apparatus comprising:
    a plurality of input terminals for receiving a YUV signal and a plurality of color component signals, said YUV signal including a luminance signal and a color difference signal;
    a selector for selecting one of said YUV signal and said plurality of color component signals which are input to said selector to provide a plurality of selected signals, and outputting said plurality of selected signals; and a signal processor for processing said plurality of selected signals, wherein one of said input terminals is shared by said YUV signal and one of said plurality of color component signals.

4. An image processing apparatus comprising an input terminal for receiving a YUV signal and a plurality of color component signals, said YUV signal including a luminance signal and a color difference signal;

a selector for selecting one of said YUV signal and said plurality of color component signals which are input to said selector to provide a plurality of selected signals, and outputting said plurality of selected signals; and a signal processor for processing said plurality of selected signals, wherein said input terminal is shared by said YUV signal and said plurality of color component signals, said signal processor comprises:

a plurality of defective pixel correction circuits for correcting said plurality of selected signals associated with a defective pixel of an image sensor with a predetermined timing; and a defective pixel correction timing generator for generating said predetermined timing used in performing defective pixel correction at a time of input of said plurality of selected signals, and said plurality of defective pixel correction circuits of said signal processor correct said plurality of selected signals in parallel at the same time with said predetermined timing, all of said plurality of selected signals being associated with said defective pixel.

5. The image processing apparatus according to claim 4, further comprising:

an oversampling circuit for interpolating a missing signal using an input signal and outputting a resultant signal to said selector; and a separation circuit for separating said YUV signal into a plurality of component signals, wherein said color difference signal included in said YUV signal includes a subsampled color difference signal, and said oversampling circuit interpolates a missing color difference signal using said subsampled color difference signal output from said separation circuit.

6. The image processing apparatus according to claim 5, further comprising an output control circuit for outputting said YUV signal to a bus without performing any processing on said YUV signal.

7. An image processing apparatus comprising:

an input terminal for receiving a multiplex signal output from an image sensor; and a sampling circuit for sampling said multiplex signal which is input to said sampling circuit, wherein said multiplex signal is formed by decomposing an $N_1$-bit ($N_1$ is a positive integer) wide color component signal into a plurality of $N_2$-bit ($N_2$ is a positive integer; $N_1$ is twice as large as $N_2$) wide data signals and performing time division multiplexing on said plurality of $N_2$-bit wide data signals, and said sampling circuit functions to mix said plurality of $N_2$-bit wide data signals to convert said plurality of $N_2$-bit wide data signals into said $N_1$-bit wide color component signal.

8. An image processing apparatus comprising:

an input terminal for receiving a multiplex signal output from an image sensor; and a sampling circuit for sampling said multiplex signal which is input to said sampling circuit, wherein said multiplex signal is formed by decomposing an $N_1$-bit ($N_1$ is a positive integer) wide color component signal into a plurality of $N_2$-bit ($N_2$ is a positive integer; $N_1$ is three times as large as $N_2$) wide data signals, and performing time division multiplexing on said plurality of $N_2$-bit wide data signals, and said sampling circuit functions to mix said plurality of $N_2$-bit wide data signals to convert said plurality of $N_2$-bit wide data signals into said $N_1$-bit wide color component signal.

9. An image processing apparatus comprising:

an input terminal for receiving a multiplex signal output from an image sensor; and a sampling circuit for sampling said multiplex signal which is input to said sampling circuit, wherein said multiplex signal is formed by decomposing an $N_1$-bit ($N_1$ is a positive integer) wide color component signal into a plurality of $N_2$-bit ($N_2$ is a positive integer; $N_1$ is four times as large as $N_2$) wide data signals, and performing time division multiplexing on said plurality of $N_2$-bit wide data signals, and said sampling circuit functions to mix said plurality of $N_2$-bit wide data signals to convert said plurality of $N_2$-bit wide data signals into said $N_1$-bit wide color component signal.

10. An image processing apparatus comprising:

an input terminal for receiving an $N_1$-bit ($N_1$ is a positive integer) wide multiplex signal formed by performing time division multiplexing on a plurality of color component signals;

a sampling circuit for sampling said $N_1$-bit wide multiplex signal input to said sampling circuit to provide said plurality of color component signals, and outputting said plurality of color component signals, as $N_2$-bit ($N_2$ is a multiple of $N_1$) wide signals, in parallel; and a signal processor for processing said plurality of color component signals output in parallel from said sampling circuit, wherein said sampling circuit samples said $N_1$-bit wide multiplex signal to provide said plurality of color component signals using a clock signal at a frequency which is $N_2/N_1$-times a frequency of a clock signal synchronous with output of said $N_2$-bit wide signals.

11. The image processing apparatus according to claim 10, wherein said sampling circuit samples said $N_1$-bit wide multiplex signal to provide said plurality of color component signals using a clock signal at a frequency which is four times said frequency of said clock signal synchronous with output of said $N_2$-bit wide signals ($N_2$ is four times as large as $N_1$).

12. The image processing apparatus according to claim 10, wherein said sampling circuit samples said $N_1$-bit wide multiplex signal to provide said plurality of color component signals using a clock signal at a frequency which is three times said frequency of said clock signal synchronous with output of said $N_2$-bit wide signals ($N_2$ is three times as large as $N_1$).

13. An image processing system for processing an image signal, comprising:

a signal processor for processing a plurality of image signals in parallel, including phase adjustment in parallel and defective pixel correction in parallel, said plurality of image signals being read out in parallel from a plurality of light receivers of an image sensor;

a plurality of output control circuits for outputting said plurality of image signals which are processed by said signal processor, to a bus, respectively; and a data transfer controller for transferring said plurality of image signals output to said bus.

14. The image processing system according to claim 13, wherein said data transfer controller includes a DMA (direct memory access) controller.

15. An image processing system for processing an image signal, comprising:

a signal processor for processing a plurality of image signals in parallel, said plurality of image signals being read out in parallel from a plurality of light receivers of an image sensor;

a plurality of output control circuits for outputting said plurality of image signals which are processed by said signal processor, to a bus, respectively; and a data transfer controller for transferring said plurality of image signals output to said bus, wherein said image sensor functions to output two image signals read out in opposite directions, said plurality of output control circuits output said two image signals which are processed in parallel by said signal processor, to said bus, respectively, and said data transfer controller functions to make an order of write addresses of one of said two image signals reverse relative to an order of write addresses of the other of said two image signals.

16. The image processing system according to claim 15, wherein said signal processor also functions to process a plurality of color component signals in parallel which are input in parallel from said image sensor to said signal processor.

17. An image capture apparatus comprising:

an image sensor; and an image processing apparatus for processing an image signal output from said image sensor, wherein said image processing apparatus comprises:

an input terminal for receiving a plurality of color component signals output in parallel from said image sensor;

a plurality of defective pixel correction circuits for correcting said plurality of color component signals associated with a defective pixel of said image sensor with a predetermined timing; and a defective pixel correction timing generator for generating said predetermined timing used in performing defective pixel correction at a time of input of said plurality of color component signals, and said plurality of defective pixel correction circuits of said image processing apparatus correct said plurality of color component signals in parallel at the same time with said predetermined timing, all of said plurality of color component signals being associated with said defective pixel.

18. An image capture apparatus comprising:

an image sensor; and an image processing apparatus for processing an image signal output from said image sensor, wherein said image processing apparatus comprises:

a plurality of input terminals for receiving a YUV signal and a plurality of color component signals, said YUV signal including a luminance signal and a color difference signal;

a selector for selecting one of said YUV signal and said plurality of color component signals which are input to said selector to provide a selected signal, and outputting said selected signal; and a signal processor for processing said selected signal, and one of said input terminals of said image signal processing apparatus is shared by said YUV signal and one of said plurality of color component signals.

19. An image capture apparatus comprising:

an image sensor; and an image processing system for processing an image signal output from said image sensor, wherein said image processing system comprises:

a signal processor for processing a plurality of image signals in parallel, including phase adjustment in parallel and defective pixel correction in parallel, which are read out in parallel from a plurality of light receivers of said image sensor;

a plurality of output control circuits for outputting said plurality of image signals which are processed by said signal processor, to a bus, respectively; and a data transfer controller for transferring said plurality of image signals output to said bus.

* * * * *